(12) United States Patent
Yoshimoto et al.

(10) Patent No.: US 9,072,097 B2
(45) Date of Patent: Jun. 30, 2015

(54) METHOD FOR SELECTING ALLOCABLE WIRELESS RESOURCES, DEVICE FOR SELECTING ALLOCABLE WIRELESS RESOURCES, AND COMMUNICATION DEVICE

(75) Inventors: Akiyo Yoshimoto, Tokyo (JP); Kojiro Hamabe, Tokyo (JP); Takahiro Nobukiyo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 112 days.

(21) Appl. No.: 13/518,632

(22) PCT Filed: Dec. 10, 2010

(86) PCT No.: PCT/JP2010/007181
§ 371 (c)(1),
(2), (4) Date: Jun. 22, 2012

(87) PCT Pub. No.: WO2011/077658
PCT Pub. Date: Jun. 30, 2011

(65) Prior Publication Data
US 2012/0257497 A1 Oct. 11, 2012

(30) Foreign Application Priority Data
Dec. 24, 2009 (JP) .................................. 2009-291665

(51) Int. Cl.
*H04W 72/04* (2009.01)
*H04W 72/08* (2009.01)

(52) U.S. Cl.
CPC ........ *H04W 72/0486* (2013.01); *H04W 72/085* (2013.01)

(58) Field of Classification Search
CPC .......... H04W 72/085; H04W 72/0486; H04W 24/02; H04W 24/04; H04W 28/0289; H04W 76/00; H04W 28/0231; H04W 28/0247; H04W 28/0268; H04W 28/0284; H04W 76/02

USPC .............. 370/229, 230, 230.1, 231, 232, 233, 370/234, 235, 235.1, 236, 236.1, 236.2, 370/237, 238, 278, 282, 287, 318, 328, 329, 370/332, 338, 343, 344, 431, 432, 437, 445, 370/447, 462, 477; 455/450, 451, 452.1, 455/452.2, 509, 522, 574, 127.5
See application file for complete search history.

(56) References Cited

U.S. PATENT DOCUMENTS 7,961,616 B2 * 6/2011 Jain et al. ...................... 370/235
2005/0282571 A1 * 12/2005 Oprescu-Surcobe et al. 455/503
(Continued)

FOREIGN PATENT DOCUMENTS

| JP | 2006-513632 A | 4/2006 |
| JP | 2006-303699 A | 11/2006 |

(Continued)

OTHER PUBLICATIONS

Ishii, WO/2009/116497 (machine translation), Sep. 2009, WIPO.*
(Continued)

*Primary Examiner* — Gary Mui
*Assistant Examiner* — Michael Phillips
(74) *Attorney, Agent, or Firm* — Sughrue Mion, PLLC

(57) ABSTRACT

A communication device includes an calculation unit, a measuring unit, a setting unit, and a determination unit. The calculation unit calculates an index value according to each of the other communication devices for determining whether to let a wireless resource utilized for communications with the other communication device be a candidate allocated to the other communication device based on the quality of a channel to the other communication device. The measuring unit measures a congestion degree between itself and the other communication device. The setting unit calculates a threshold value for determining whether to let the wireless resource be the candidate allocated to the other communication device based on the measured congestion degree. The determination unit compares the index value with the threshold value to determine whether to let the wireless resource be the candidate allocated to the other communication device.

20 Claims, 21 Drawing Sheets

(56) References Cited

U.S. PATENT DOCUMENTS

| | | |
|---|---|---|
| 2006/0079268 A1* | 4/2006 | Livet et al. .................... 455/522 |
| 2006/0142020 A1* | 6/2006 | Mueckenheim et al. ..... 455/453 |
| 2007/0127378 A1* | 6/2007 | Yang et al. .................... 370/235 |
| 2007/0265017 A1* | 11/2007 | Ishii et al. ..................... 455/453 |
| 2008/0186918 A1* | 8/2008 | Tinnakornsrisuphap et al. ............................. 370/331 |
| 2008/0304416 A1 | 12/2008 | Fodor et al. |
| 2009/0175183 A1* | 7/2009 | Mochizuki et al. ........... 370/252 |
| 2010/0008226 A1* | 1/2010 | Kang et al. .................... 370/235 |
| 2010/0046369 A1* | 2/2010 | Zhao et al. .................... 370/232 |
| 2010/0214928 A1* | 8/2010 | Nogami et al. ............... 370/241 |
| 2010/0220652 A1* | 9/2010 | Ishii et al. ..................... 370/328 |
| 2010/0226248 A1* | 9/2010 | Grilli ............................. 370/230 |
| 2010/0240371 A1* | 9/2010 | Cook et al. .................... 455/436 |
| 2010/0309781 A1* | 12/2010 | Wang et al. ................... 370/229 |
| 2011/0267944 A1* | 11/2011 | Stjernholm et al. .......... 370/230 |
| 2012/0140632 A1* | 6/2012 | Norp et al. .................... 370/235 |

FOREIGN PATENT DOCUMENTS

| | | |
|---|---|---|
| JP | 2008-187449 A | 8/2008 |
| JP | 2009-521831 A | 6/2009 |
| WO | WO-2008/136390 * 11/2008 | .................... 370/252 |
| WO | 2009/116489 A1 9/2009 | |
| WO | WO-2009/116497 * 9/2009 | .................... 370/238 |
| WO | WO-2009/122776 * 10/2009 | .................... 709/226 |

OTHER PUBLICATIONS

Nobukiyo, WO/2009/122776 (machine translation), Oct. 2009, WIPO.*

Hambe, WO/2008/136390 (machine translation),Nov. 2008, WIPO.*

Lei et al., "Adaptive Connection Admission Control Algorithm for LTE Systems", May 11-14, 2008, Vehicular Technology Conference, 2008, VTC Spring 2008, IEEE, Singapore, pp. 2336-2340.*

B. R. Badrinath, et al., "To Send or Not to Send: Implementing Deferred Transmissions in Mobile Host", Distributed Computing Systems, Proceedings of the 16th ICDCS, May 1996, pp. 327-333.

Ying Jun (Angela) Zhang, et al., "Link-Adaptive Largest-Weighted-Throughput Packet Scheduling for Real-Time Traffics in Wireless OFDM Networks", IEEE Globecom, 2005, pp. 2490-2494, vol. 5.

Pravin Bhagwat, et al., "Enhancing throughput over wireless LANs using Channel State Dependent Packet Scheduling", IEEE Proc. INFOCOM'96, Mar. 1996, pp. 1133-1140, vol. 3.

* cited by examiner (b) HIGH CONGESTION DEGREE (a) LOW CONGESTION DEGREE

METHOD FOR SELECTING ALLOCABLE WIRELESS RESOURCES, DEVICE FOR SELECTING ALLOCABLE WIRELESS RESOURCES, AND COMMUNICATION DEVICE

TECHNICAL FIELD

The present application claims priority from Japanese Patent Application No. 2009-291665, filed on Dec. 24, 2009 in Japan, the disclosure of which incorporated herein by reference in its entirety. The present invention relates to methods for selecting allocable wireless resources for wireless communication systems and, in particular, to a method for selecting allocable wireless resources, a device for selecting allocable wireless resources, and a communication device to realize the reduction of transmitter's power consumption.

BACKGROUND ART

In order to realize the primary goal, schedulers of wireless communication systems calculate allocation indexes corresponding to the channel quality, and allocate wireless resources according to those allocation indexes. As a technique relating to schedulers for the purpose of reducing power consumption, i.e. power saving (to be referred to as power saving schedulers hereinafter), there are CSDP (Channel State Dependent Packet) schedulers (see Nonpatent Documents 1 and 2).

In Nonpatent Documents 1 and 2, the receiver's received signal level Pr is utilized as the allocation index. The scheduler compares the receiver's received signal level Pr with a preset threshold value Pth. The scheduler determines the receivers with a received signal level Pr equal to or higher than the threshold value Pth to be in a 'good state'. Further, the scheduler determines the receivers with a received signal level Pr lower than the threshold value Pth to be in a 'bad state' (see FIG. 20). The scheduler restrains wireless resources from allocation to the receivers according to the determination results. In Nonpatent Document 1, wireless resources are allocated preferentially to the receivers determined to be in the good state. In Nonpatent Document 2, wireless resources are allocated only to the receivers determined to be in the good state.

On the other hand, Nonpatent Document 3 has proposed a cross-layer scheduler taking congestion control into consideration. First, the cross-layer scheduler calculates the allocation index from the channel quality measured at the PHY layer (Physical layer), and the time margin up to allowable delay measured at the MAC layer (Media Access Control layer). Next, the cross-layer scheduler allocates wireless resources according to the allocation index calculated above. By virtue of this, the cross-layer scheduler realizes congestion control and throughput maximization simultaneously.

Further, Patent Document 1 discloses a method for scheduling wireless communication systems sending data from devices in wireless base stations by calculating indexes for selecting mobile stations based on the line quality between a plurality of mobile stations and the devices in the wireless base stations, and selecting mobile stations based on those indexes. Further, Patent Document 2 discloses a technique for allocating resources of communication systems by utilizing a plurality of allocation procedures including a low-speed allocation procedure and a high-speed procedure.

Patent Document 1: JP 2008-187449 A
Patent Document 2: Japanese Translation of PCT 2006-513632 A Nonpatent Document 1: P. Bhaqwat, P. Bhattacharya, A. Krishna, and S. K. Tripathi, "Enhancing throughput over wireless LANs using channel state dependent packet scheduling," IEEE Proc. INFOCOM'96, Vol. 3, pp. 1133-11 40, San Francisco, Calif., USA, March 1996.

Nonpatent Document 2: B. R. Badrinath and P. Sudame, "To send or not to send: implementing deferred transmissions in a mobile host," Distributed Computing Systems, 1996., Proceedings of the 16th International Conference on, pp. 327-333, Hong Kong, May 1996.

Nonpatent Document 3: Y. J. Zhang and S. C. Liew, "Link-adaptive largest-weighted-throughput packet scheduling for real-time traffics in wireless OFDM networks," in Proc. IEEE Global Telecommunications Conf., vol. 5, pp. 2490-2494, St. Louis, Mo., 2005.

According to the techniques described in Nonpatent Documents 1 and 2, because the transmitter has raised the probability of transmission to the receivers with a received signal level Pr equal to or higher than the threshold value Pth, it is possible to reduce the transmission power per transmission rate, thereby realizing power saving. However, because of the insufficient opportunity of allocating wireless recourses to the receivers determined to be in the bad state, in the case of a high degree of congestion, there is a problem that congestion will occur.

On the other hand, according to the technique described in Nonpatent Document 3, because of calculating the allocation index from the channel quality and the time margin up to allowable delay, it is possible to avoid congestion. However, with the technique described in Nonpatent Document 3, in the case of a low degree of congestion, because the allocation frequency is increased to the receivers with bad channel quality, the effect of power saving is small.

That is, as for Nonpatent Documents 1, 2 and 3, it is difficult to achieve both objectives of restraining congestion and saving power. On the other hand, in Patent Documents 1 and 2, there are no descriptions about any technique for achieving both objectives of restraining congestion and saving power.

Further, it is conceivable to formulate a method of utilizing the technique described in Nonpatent Document 3 to calculate the allocation index, comparing this calculated allocation index with the threshold value preset as described in Nonpatent Document 1 or 2, determining the receivers to be in either of the good state or the bad state, and restraining wireless resources from allocation to receivers according to the determination results. However, in such a method, because a fixed value is adopted for the threshold value compared with the allocation index, it is difficult to achieve both objectives of restraining congestion and saving power. The reason will be explained hereinbelow utilizing FIGS. 21A and 21B.

FIGS. 21A and 21B show an example of the relationship between the degree of congestion and the threshold value of channel quality allowing for wireless resource allocation. In FIGS. 21A and 21B, the number of packets waiting for transmission is denoted by the number of darkly painted squares. For example, the number of packets waiting for transmission to the receiver 12 is two. Receivers are aligned in the order of channel quality. The scheduler classifies the receivers with an allocation index equal to or higher than the threshold value into the good state based on the channel quality, and allocates wireless resources only to receivers in the good state.

In FIG. 21A, the threshold value is set to be low (the threshold value 1). When a low threshold value is set, wireless resources are allocated also to the receivers with unfavorable channel quality. Therefore, the effect of preventing the occurrence of congestion is increased. In the case of a large number of receivers waiting for transmission and a large number of packets each waiting for transmission, a low threshold value leads to a good result. However, as shown in FIG. 21A, even in the case of a small number of receivers waiting for transmission and a small number of packets each waiting for transmission, wireless resources are still allocated to the receivers with unfavorable channel quality, thereby lowering the effect of power saving.

In FIG. 21B, the threshold value is set to be high (the threshold value 2). When a high threshold value is set, wireless resources are not allocated to the receivers with unfavorable channel quality. Therefore, the effect of power saving is increased. In the case of a small number of receivers waiting for transmission and a small number of packets each waiting for transmission, a high threshold value leads to a good result. However, as shown in FIG. 21B, in the case of a large number of receivers waiting for transmission and a large number of packets each waiting for transmission, because of the increased terminals to which wireless resources are not allocated and thus transmission is not allowed, the waiting time of the transmission packets increases at a great rate, thereby giving rise to congestion.

As described hereinbefore, when the threshold value is fixed, it is difficult to sufficiently achieve the power-saving effect while restraining the occurrence of congestion.

SUMMARY

An exemplary object of the present invention is to provide a method for selecting allocable wireless resources to solve the above problem that it is difficult to achieve the power-saving effect while restraining the occurrence of congestion when a preset threshold value is utilized.

An aspect in accordance with the present invention provides an allocable wireless resource selection method for a wireless communication system including a first communication device or devices, and a second communication device in wireless communication with the first communication device, the selection method including: calculating an index value according to each of the first communication devices for determining whether or not to let a wireless resource utilized for communications between the first communication device and the second communication device be a candidate allocated to the first communication device, based on the quality of a channel between the first communication device and the second communication device; measuring a congestion degree between the first communication device and the second communication device; calculating a threshold value for determining whether or not to let the wireless resource be the candidate allocated to the first communication device, based on the measured congestion degree; and comparing the index value with the threshold value to determine whether or not to let the wireless resource be the candidate allocated to the first communication device.

Another aspect in accordance with the present invention provides an allocable wireless resource selection device for a wireless communication system including a first communication device or devices, and a second communication device in wireless communication with the first communication device, the selection device including: an index value calculation unit for calculating an index value according to each of the first communication devices for determining whether or not to let a wireless resource utilized for communications between the first communication device and the second communication device be a candidate allocated to the first communication device, based on the quality of a channel between the first communication device and the second communication device; a congestion degree measuring unit for measuring a congestion degree between the first communication device and the second communication device; a threshold value setting unit for calculating a threshold value for determining whether or not to let the wireless resource be the candidate allocated to the first communication device, based on the measured congestion degree; and a determination unit for comparing the index value with the threshold value to determine whether or not to let the wireless resource be the candidate allocated to the first communication device.

Still another aspect in accordance with the present invention provides a communication device in wireless communication with another communication device or devices, the communication device including: an index value calculation unit for calculating an index value according to each of the other communication devices for determining whether or not to let a wireless resource utilized for communications between itself and the other communication device be a candidate allocated to the other communication device, based on the quality of a channel between itself and the other communication device; a congestion degree measuring unit for measuring a congestion degree between itself and the other communication device; a threshold value setting unit for calculating a threshold value for determining whether or not to let the wireless resource be the candidate allocated to the other communication device, based on the measured congestion degree; and a determination unit for comparing the index value with the threshold value to determine whether or not to let the wireless resource be the candidate allocated to the other communication device.

Because the present invention is configured in such a manner as described hereinabove, it is possible to achieve the power-saving effect while restraining the occurrence of congestion.

EXEMPLARY EMBODIMENTS

Next, referring to the accompanying drawings, exemplary embodiments of the present invention will be explained in detail.

<A First Exemplary Embodiment>

[Configurational Explanation]

Figure 1:
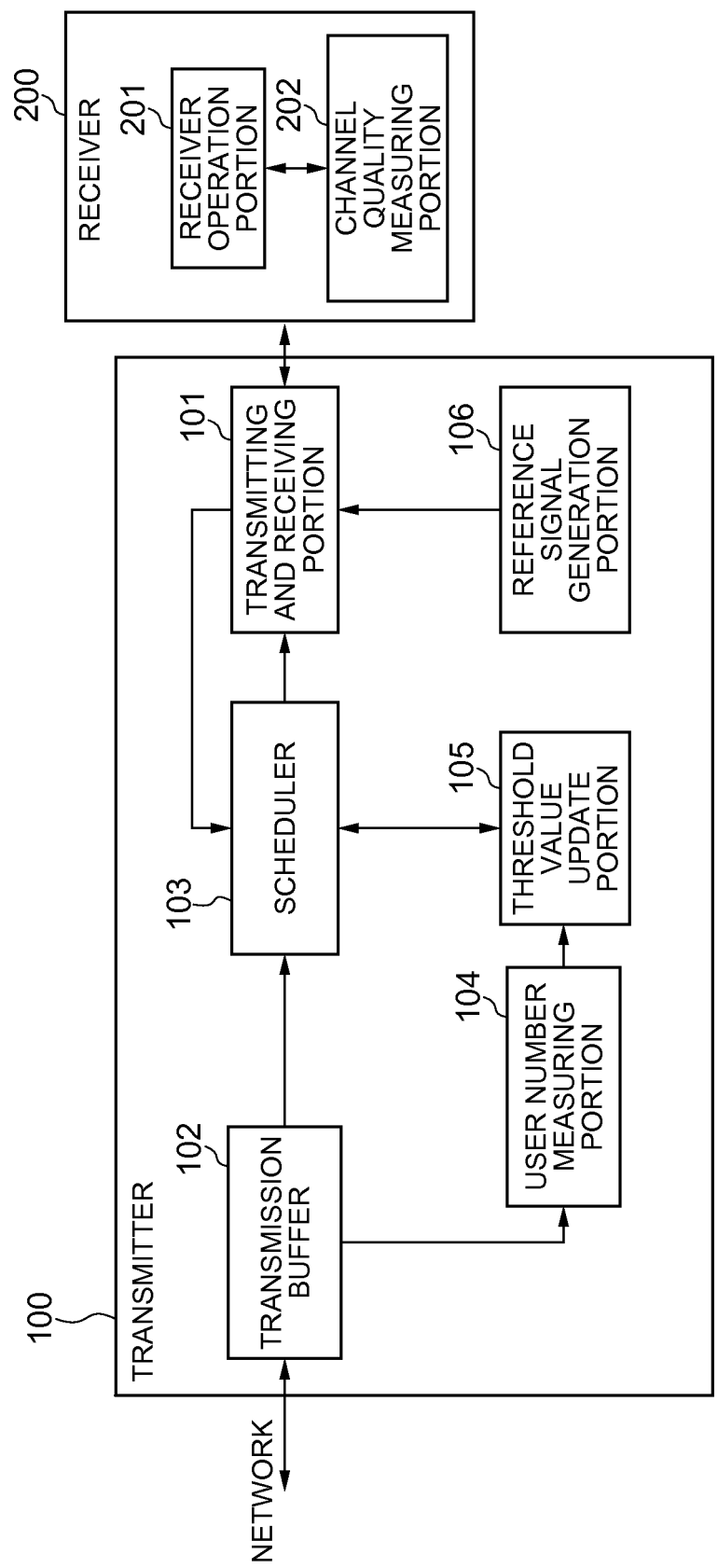
FIG. 1 is a block diagram showing a configuration of a wireless communication system in accordance with a first exemplary embodiment of the present invention.

FIG. 1 is a block diagram showing a configuration of a wireless communication system in accordance with the first exemplary embodiment of the present invention. Referring to FIG. 1, this wireless communication system includes at least one transmitter 100, and a plurality of receivers 200. The transmitter 100 and the receiver 200 are connected via a wireless line (not shown). Further, the transmitter 100 is connected to a network (not shown). Further, although the transmitter 100 is connected with one receiver 200 in FIG. 1, generally, it is possible to connect the transmitter 100 with a plurality of receivers 200. The receiver 200 corresponds to a terminal (a mobile station) of the wireless communication system, while the transmitter 100 corresponds to a wireless base station device of the wireless communication system. Further, the receiver 200 corresponds to a first communication device, while the transmitter 100 corresponds to a second communication device.

In the first exemplary embodiment, explanations will be made with an example of downlink (transmission from base station to terminal) of LTE (Long Term Evolution). The method of downlink wireless access is supposed to be OFDMA (Orthogonal Frequency Division Multiple Access), and the minimum bandwidth for OFDMA allocation is regarded as one wireless resource. Further, in the present description, a communication device as an object of wireless resource allocation is referred to as a user. In the first exemplary embodiment, the receiver 200 is the user.

The transmitter 100 is composed of a transmitting and receiving portion 101, a transmission buffer 102, a scheduler 103, a user number measuring portion 104, a threshold value update potion 105, and a reference signal generation portion 106.

The transmitting and receiving portion 101 has a function of sending data needed for transmission to the receiver 200 to the receiver 200 by utilizing the wireless resource allocated to the receiver 200 based on information of wireless resource allocation and transmission data notified from the scheduler 103. The above-mentioned information of wireless resource allocation includes information for identifying the wireless resource, and information for identifying the receiver 200 to which the wireless resource is allocated. To the above-mentioned transmission data, information is added to indicate to which receiver 200 the data is needed for transmission. Further, the transmitting and receiving portion 101 has a function of sending a reference signal generated in the reference signal generation portion 106 to the receiver 200. Further, the transmitting and receiving portion 101 has a function of notifying the scheduler 103 of information of channel quality notified from the receiver 200.

The transmission buffer 102 has a function of accumulating the arrived packets for the receivers 200 along with the packet management information according to each user (receiver 200). The packet management information includes information of packet arrival time, packet size, and the like.

The scheduler 103 has a function of calculating the allocation index corresponding to the receiver 200 by utilizing the information of channel quality notified from the receiver 200 through the transmitting and receiving portion 101. The allocation index for the receiver 200 has a correlation with the channel quality of the receiver 200. Further, the scheduler 103 has a function of determining whether or not to let the wireless resource be a candidate allocated to the receiver 200 by comparing the calculated allocation index for the receiver 200 with the threshold value notified from the threshold value update potion 105. Further, the scheduler 103 has a function of actually allocating the wireless resource to the receiver 200. Further, the scheduler 103 has a function of notifying the threshold value update potion 105 of the calculated allocation index according to each receiver 200 for updating the threshold value.

The user number measuring portion 104 has a function of measuring the congestion degree of communication from the transmitter 100 to the receiver 200 and notifying the threshold value update potion 105 of the same. The congestion degree measured by the user number measuring portion 104 is a numerical value indicating how much the probability is for the congestion to occur in communication from the transmitter 100 to the receiver 200. The larger the numerical value of the congestion degree, the higher the probability for the congestion to occur. The user number measuring portion 104 measures the congestion degree based on the condition of accumulating the packets in the transmission buffer 102 according to each receiver 200. In particular, the user number measuring portion 104 calculates the mean value of the number of users (the number of receivers) whose transmission data are accumulated in the transmission buffer 102, and takes the calculation result as the congestion degree to notify the threshold value update potion 105.

The threshold value update potion 105 has a function of calculating the threshold value for determining whether or not to let the wireless resource be a candidate allocated to the receiver 200, and notifying the scheduler 103 of the same. The threshold value update potion 105 updates the threshold value by utilizing the mean value of the number of users indicating the congestion degree notified from the user number measuring portion 104, and the allocation index for each receiver 200 notified from the scheduler 103. The threshold value calculated above indicates the limit of the channel quality allowing for allocation. The threshold value update potion 105 in the first exemplary embodiment calculates the threshold value for common utilization among the plurality of receivers 200.

The reference signal generation portion 106 has a function of generating the reference signal at a predetermined time for measuring the channel quality of the receiver 200, and sending the same to the transmitting and receiving portion 101.

The receiver 200 is composed of a receiver operation portion 201 and a channel quality measuring portion 202.

The receiver operation portion 201 has a function of notifying the channel quality measuring portion 202 of the level of the reference signal received from the transmitter 100.

Further, the receiver operation portion 201 has a function of reporting to the transmitter 100 about the information of channel quality notified from the channel quality measuring portion 202.

The channel quality measuring portion 202 has a function of measuring the channel quality based on the above-mentioned notification from the receiver operation portion 201, and notifying the receiver operation portion 201 of the same. The channel quality measuring portion 202 measures the SINR (Signal-to-Interference plus Noise power Ratio), for example, as the channel quality, and notifies the receiver operation portion 201 of the measured result as the information of channel quality.

[Operational Explanation]

Next, referring to the figure, detailed explanations will be made with respect to an operation of the first exemplary embodiment shown in FIG. 1.

Figure 2:
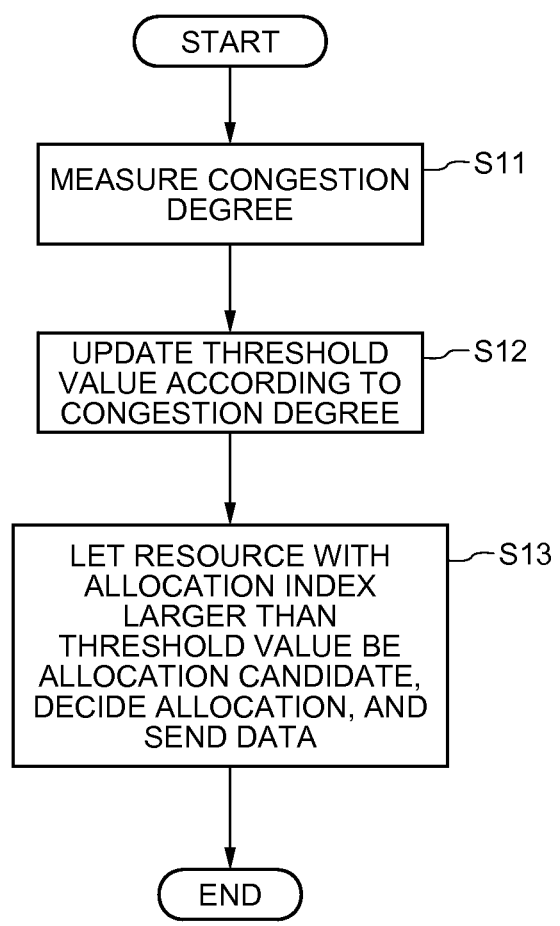
FIG. 2 is a flowchart showing an outline of an overall operation procedure in accordance with the first exemplary embodiment of the present invention.

FIG. 2 shows an outline of an overall operation procedure of the transmitter 100 from updating the threshold value as the reference for allocating a wireless resource, up to allocating, then, the wireless resource to the receiver 200 based on the threshold value.

First, the user number measuring portion 104 measures the mean value AveNu of the number of users (the number of receivers 200) having data in the transmission buffer 102 as the congestion degree, and notifies the threshold value update potion 105 of this AveNu (S11).

Next, the threshold value update potion 105 updates the threshold value Th_Met of the channel quality allowing for allocating the wireless resource according to the AveNu, and notifies the scheduler 103 of the same (S12).

Next, the scheduler 103 compares the allocation index for each receiver 200 with the threshold value Th_Met, and lets the wireless resources with the allocation index for the receiver 200 equal to or larger than the threshold value Th_Met be candidates of wireless resources allocated to the receivers 200. Next, the scheduler 103 decides the receiver 200 for actually allocating the wireless resource candidate. If there are a plurality of receivers 200 for the same one wireless resource candidate, then, for example, it is preferentially allocated to the receiver with a higher channel quality. Next, the scheduler 103 sends the data in the transmission buffer 102 to each receiver 200 based on the allocation result (S13).

Next, each of the steps S11, S12 and S13 will be explained in detail.

Figure 3:
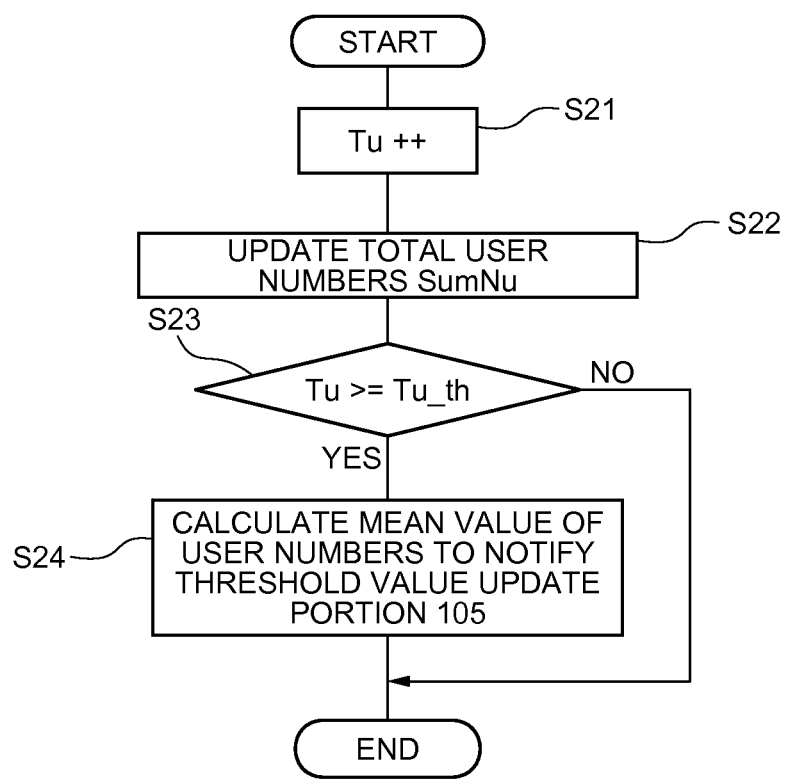
FIG. 3 is a flowchart showing an operation procedure of a user numbers measuring portion in accordance with the first exemplary embodiment of the present invention.

FIG. 3 is a flowchart showing a detail of the step S11 in FIG. 2. The user number measuring portion 104 carries out the process shown in the flowchart of FIG. 3 at each predetermined TTI (Transmit Time Interval). First, the user number measuring portion 104 increments the timer Tu by one (S21). Next, the user number measuring portion 104 measures the number Nu(Tu) of the users (receivers 200) having data in the transmission buffer 102, and updates the total user numbers SumNu according to the Formula 1 shown below (S22). That is, it adds the presently measured Nu(Tu) to the latest total user numbers SumNu. Here, the initial values of Tu and SumNu are both zero.

$$\mathrm{Sum}Nu = \mathrm{Sum}Nu + Nu(Tu) \qquad \text{Formula 1}$$

Next, the user number measuring portion 104 compares the timer Tu with a predetermined period Tu_th and, if the timer Tu is equal to or larger than the period Tu_th (S23: Yes), then it calculates the mean value of the user numbers AveNu with the Formula 2 shown below, notifies the threshold value update potion 105 of the calculation result of AveNu, and resets the timer Tu and the total user numbers SumNu to zero (S24). The calculation result of AveNu indicates the mean value of the number of users having transmission data during a predetermined period in the past.

$$\mathrm{Ave}Nu = \mathrm{Sum}Nu/Tu \qquad \text{Formula 2}$$

Further, the user number measuring portion 104 ends the present process if the timer Tu is smaller than the period Tu_th (S23: No).

Figure 4:
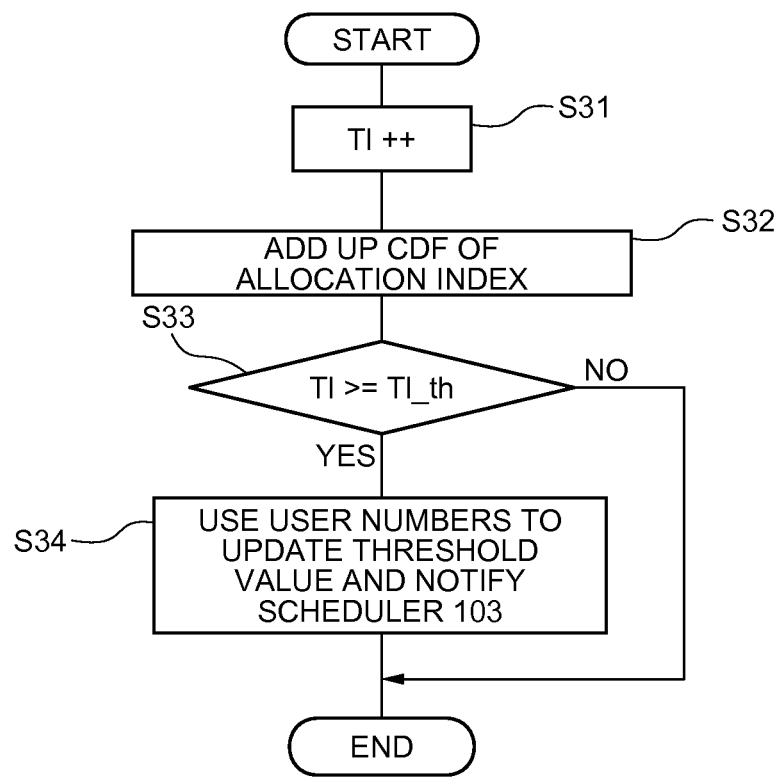
FIG. 4 is a flowchart showing an operation procedure of a threshold value update portion in accordance with the first exemplary embodiment of the present invention.

FIG. 4 is a flowchart showing a detail of the step S12 in FIG. 2. The threshold value update potion 105 carries out the process shown in the flowchart of FIG. 4 at each predetermined transmit time interval TTI. First, the threshold value update potion 105 increments the timer T1 by one (S31). Next, the threshold value update potion 105 adds up CDF (Cumulative Density Function) of the allocation index (S32). Then, the threshold value update potion 105 compares the timer T1 with a predetermined period T1_th (S33). As a result of the comparison, if the timer T1 is equal to or larger than the period T1_th (S33: Yes), then the threshold value update potion 105 utilizes the CDF of the allocation index, and the AveNu notified from the user number measuring portion 104 to update the threshold value Th_Met by an aftermentioned method, notifies the scheduler 103 of the updated Th_Met, and resets the timer T1 and the added-up CDF (S34). Further, the threshold value update potion 105 ends the present process if the timer T1 is smaller than the period T1_th (S33: No).

Figure 5:
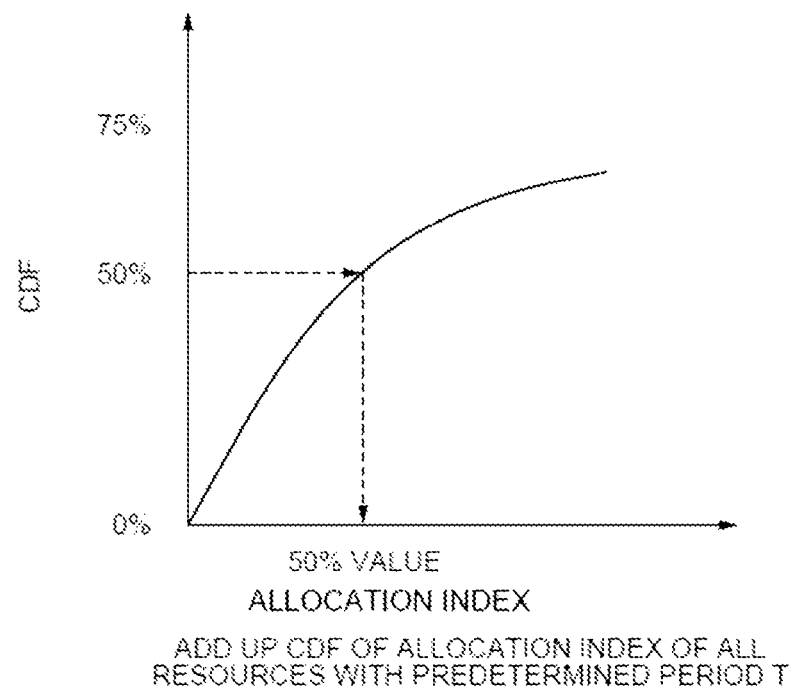
FIG. 5 shows CDF of an allocation index in accordance with the first exemplary embodiment of the present invention.

Next, referring to FIGS. 5 and 6, a method for updating the threshold value Th_Met will be explained by utilizing the CDF of the allocation index, and the AveNu notified from the user number measuring portion 104.

In the first exemplary embodiment, the value of some parameter p is decided from the mean value of the user numbers AveNu, and the threshold value Th_Met is updated to be the value at p % of the CDF of the allocation index. The value at p % of the CDF of the allocation index corresponds to the value of the allocation index at the position p % from the bottom of a permutation denoted as {Y(0), Y(1), Y(2), ..., Y(N−1)} of the sorted set, in ascending order, of the allocation indexes for the respective receivers 200 notified from the scheduler 103 to the threshold value update potion 105 during the period T1_th. As shown in FIG. 5, for example, when the value of the parameter p is 50, then the updated threshold value Th_Met is the value at 50% of the CDF. As shown in FIG. 6, the value of the parameter p is decided from the mean value of the user numbers AveNu. In FIG. 6, the smaller the mean value of the user numbers AveNu, the larger the value of setting the parameter p, whereas the larger the mean value of the user numbers AveNu, the smaller the value of setting the parameter p.

If the mean value of the user numbers AveNu is small, that is, if the number of the receivers 200 with the transmission data accumulated in the transmission buffer 102 is small, then the possibility for congestion to occur is low. Thereby, congestion is still unlikely to occur even if the threshold value Th_Met is increased to allocate wireless resources only to the receivers 200 with a better channel quality. Therefore, when the mean value of the user numbers AveNu is small, in order to further improve the power-saving effect, the threshold value Th_Met is set to be a large value.

On the other hand, if the mean value of the user numbers AveNu is large, that is, if the number of the receivers 200 with the transmission data accumulated in the transmission buffer 102 is large, then the possibility for congestion to occur is high. Thereby, congestion is likely to occur if the threshold value Th_Met is increased to allocate wireless resources only to the receivers 200 with a better channel quality. Therefore, when the mean value of the user numbers AveNu is large, in order to prevent the occurrence of congestion, the threshold value Th_Met is set to be a small value.

Figure 6:
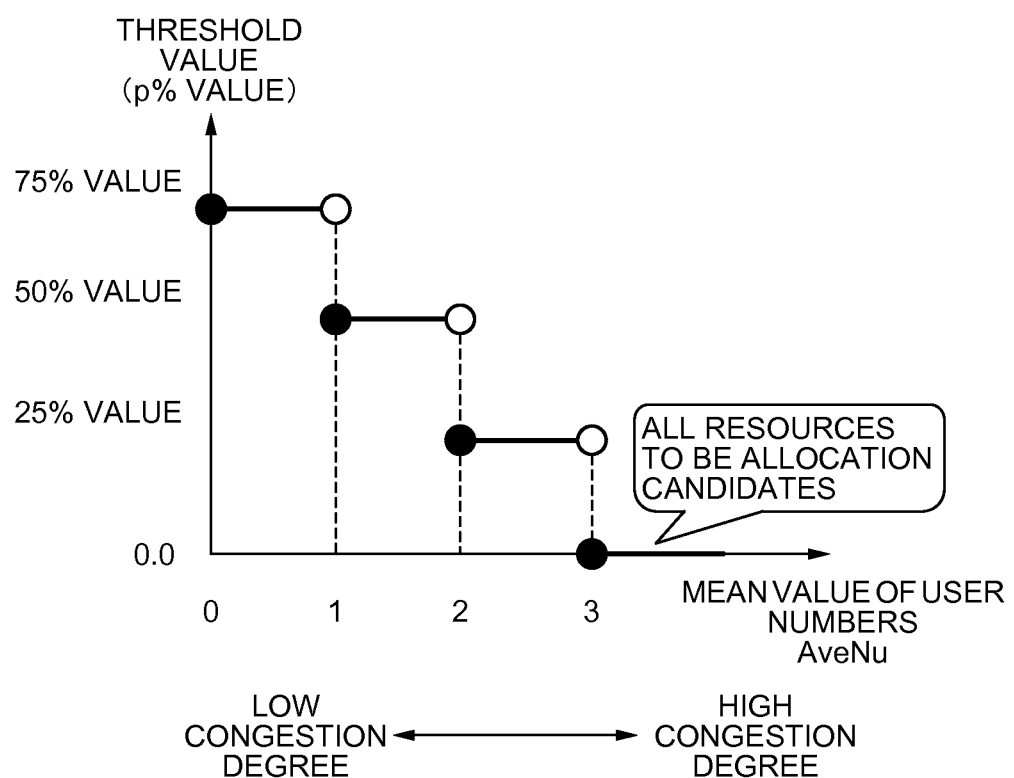
FIG. 6 shows a relationship between a mean value of the user numbers and a threshold value in accordance with the first exemplary embodiment of the present invention.

In FIG. 6, when the mean value of the user numbers AveNu is equal to or larger than zero but smaller than one, the threshold value Th_Met is taken to be 75% of the CDF value; when the mean value of the user numbers AveNu is equal to or larger than one but smaller than two, the threshold value Th_Met is taken to be 50% of the CDF value; when the mean value of the user numbers AveNu is equal to or larger than two but smaller than three, the threshold value Th Met is taken to be 25% of the CDF value; and when the mean value of the user numbers AveNu is equal to or larger than three, the threshold value Th_Met is taken to be 0.0. When the threshold value Th_Met is taken to be 0.0, all resources become allocation candidates.

Figure 7:
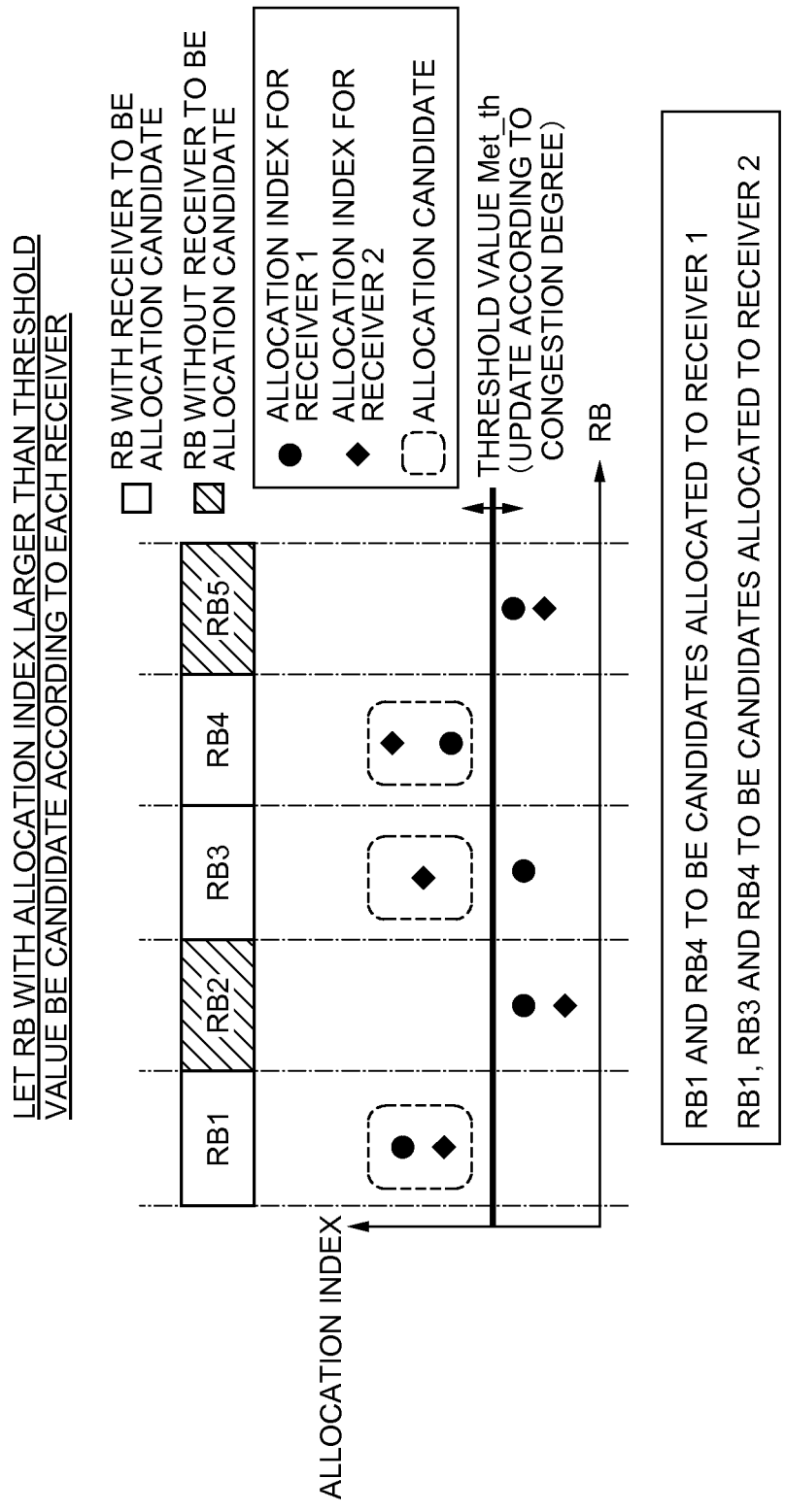
FIG. 7 shows a particular example of the result of selecting candidates for resource allocation in accordance with the first exemplary embodiment of the present invention.

Next, utilizing FIG. 7, a particular example will be explained for the selection result of resource allocation candidates explained in the step S13 of FIG. 2. In FIG. 7, RB (Resource Block) represents the wireless resource; the number of RBs is supposed to be five, and the number of receivers is supposed to be two. Further, a circle indicates the allocation index for the receiver 1, while a rhomboid indicates the allocation index for the receiver 2.

The scheduler 103 calculates the allocation index of each RB for each receiver. Then, the scheduler 103 compares the allocation index of each RB with the threshold value Th_Met for each receiver, and selects the RB with the allocation index equal to or larger than the threshold value Th_Met to be an allocable RB to the corresponding receiver. In FIG. 7, among the allocation indexes of the respective RBs for the receiver 1, the allocation indexes of the RB 1 and RB4 are larger than the threshold value Th_Met. Therefore, the RB1 and RB4 are selected to be allocable RBs to the receiver 1. In FIG. 7, among the allocation indexes of the respective RBs for the receiver 2, the allocation indexes of the RB 1, RB3 and RB4 are larger than the threshold value Th_Met. Therefore, the RB1, RB3 and RB4 are selected to be allocable RBs to the receiver 2. Since the RB2 and RB5 have the allocation indexes smaller than the threshold value Th_Met for both the receivers 1 and 2, they are not included in the allocation candidates. As a result, in the succeeding allocation process, only the RBs with a good channel quality are actually allocated, thereby allowing power saving to be realized.

Subsequently, for RBs having receivers to be allocation candidates, the receivers are selected from the allocation candidates to actually allocate wireless resources. For an RB having a plurality of receivers to be allocation candidates, an arbitrary method may be applied to select a unique receiver for allocating that RB. For example, such a method may be applied as to utilize the allocation index explained in the first exemplary embodiment as a reference value, and select the receiver having a larger reference value. For example, in the case of the RB1 in FIG. 7, because the allocation index for the receiver 1 is larger than that of the receiver 2, the receiver 1 is selected as the receiver for allocating the RB1. Further, other reference values may as well be utilized such as those taking transmission delay and the like into consideration as the reference values utilized for the selection.

In the above manner, according to the first exemplary embodiment, the threshold value is calculated according to the congestion degree for determining whether or not to put up allocation candidates and, if the allocation index for a receiver is larger than the above threshold value, then the wireless resource becomes a candidate for allocation to the receiver. By virtue of this, it is possible to allocate the wireless resource for transmission to the receiver with as good channel quality as possible within a possible range of restraining the occurrence of congestion. As a result, it is possible to minimize the number of transmissions or maximize the transmission rate per unit electric power without the occurrence of congestion, thereby allowing the power-saving effect to be achieved.

Further, according to the first exemplary embodiment, it is possible to improve the maximal throughput of a communication system composed of a plurality of transmitters. The reason is that because transmissions are limited to the receivers with good channel quality, it is possible to reduce the number of transmissions of each transmitter, thereby allowing for reduction of interference in the same channel.

Further, according to the first exemplary embodiment, by utilizing the number of the receivers having transmission data as the congestion degree, it is possible to realize the power saving to the maximum extent possible while restricting the number of the receivers having transmission data to a predetermined value or lower.

In the first exemplary embodiment, the channel quality measuring portion 202 of the receiver 200 measures the SINR as the channel quality. However, the present invention is not limited to this. For example, as the channel quality, the SNR (Signal-to-Noise power Ratio) may as well be measured. Further, as the channel quality, the SIR (Signal-to-Interference power Ratio) may as well be measured.

Further, in the first exemplary embodiment, the latest channel quality itself of the receiver 200 is utilized as the allocation index for the receiver 200. However, the present invention is not limited to this. It is possible to utilize any information as the allocation index for a receiver 200 as long as the information has a correlation with the latest channel quality of the receiver 200. For example, the ratio of the latest channel quality reported from a receiver 200 to the mean value of the channel quality reported from the receiver 200 during a predetermined period in the past, i.e., the reported channel quality/the average channel quality, may be utilized as the allocation index for the receiver 200. When utilizing such an allocation index, the transmission opportunity is increased for the receiver with a bad condition of channel quality continuing for a while, thereby improving the equality in throughput.

<A Second Exemplary Embodiment>

[Configurational Explanation]

Figure 8:
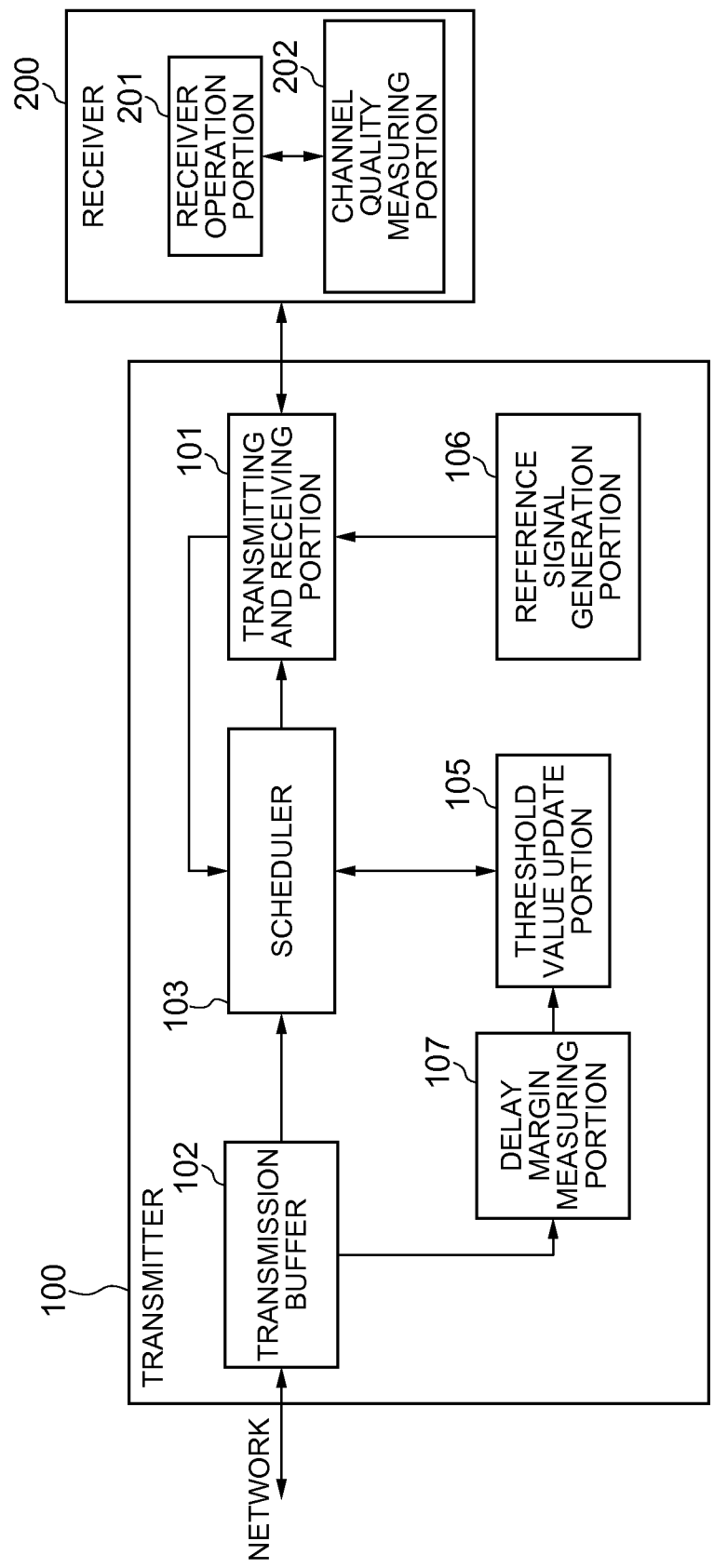
FIG. 8 is a block diagram showing a configuration of a wireless communication system in accordance with a second exemplary embodiment of the present invention.

Next, referring to the accompanying drawings, a second exemplary embodiment of the present invention will be explained in detail. FIG. 8 shows a configuration of a wireless communication system in accordance with the second exemplary embodiment. Referring to FIG. 8, compared with the first exemplary embodiment of FIG. 1, the second exemplary embodiment differs in the aspect that the transmitter 100 has a delay margin measuring portion 107 instead of the user number measuring portion 104.

The delay margin measuring portion 107 has a function of measuring the congestion degree for each receiver 200 and notifying the threshold value update potion 105 of the same. The congestion degree measured by the delay margin measuring portion 107 is a numerical value indicating how much the probability is for the congestion to occur in communication from the transmitter 100 to the receiver 200. The larger the numerical value of the congestion degree, the higher the probability for the congestion to occur. The delay margin measuring portion 107 calculates the mean value of the delay margin of each receiver 200 based on the condition of accumulating the packets in the transmission buffer 102 according to each receiver 200, and takes the calculation result as the congestion degree to notify the threshold value update potion 105.

The threshold value update potion 105 has a function of utilizing the mean value of the delay margin indicating the congestion degree of each receiver 200 notified from the delay margin measuring portion 107, and the allocation index for each receiver 200 notified from the scheduler 103, to calculate the threshold value for each receiver 200 to determine whether or not to let the wireless resources be allocation candidates to the receivers 200, and to notify the scheduler 103 of the same.

[Operational Explanation]

Figure 9:
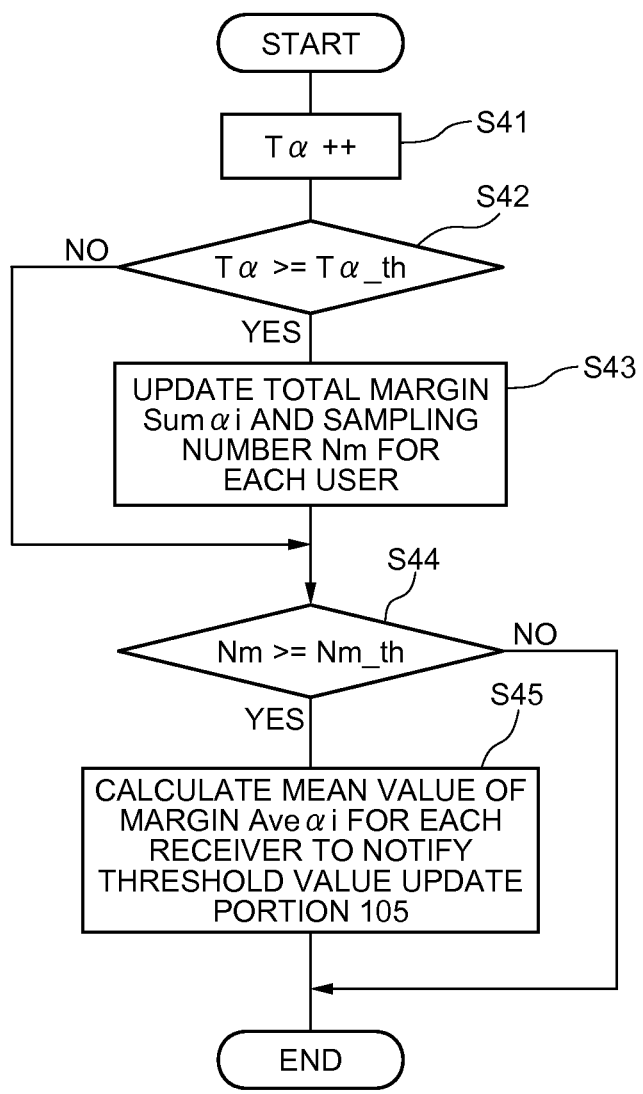
FIG. 9 is a flowchart showing an operation procedure of a delay margin measuring portion in accordance with the second exemplary embodiment of the present invention.
Figure 10:
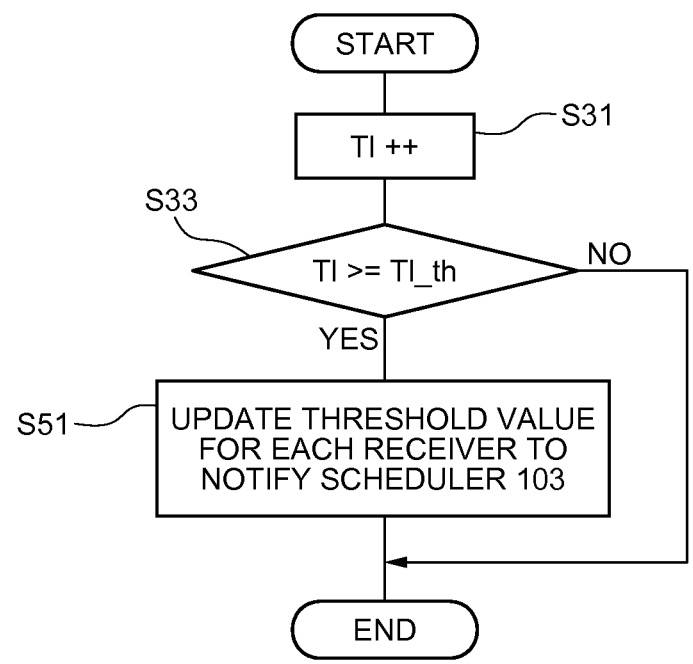
FIG. 10 is a flowchart showing an operation procedure of a threshold value update portion in accordance with the second exemplary embodiment of the present invention.

Next, focused on the different aspect with the first exemplary embodiment, the operation of the second exemplary embodiment will be explained with reference to the accompanying drawings. In the second exemplary embodiment, in common with the first exemplary embodiment, FIG. 2 shows an outline of an overall operation procedure of the transmitter 100 from updating up to allocating the wireless resource based on the threshold value. In the second exemplary embodiment, the flowchart in FIG. 9 shows a detail of the step (S11) for measuring the congestion degree, while the flowchart in FIG. 10 shows a detail of the step (S21) for updating the threshold value. Hereinbelow, each step will be explained in detail.

FIG. 9 is a flowchart showing a detail of the step S11 in FIG. 2 in the second exemplary embodiment. The delay margin measuring portion 107 carries out the process shown in the flowchart of FIG. 9 at each predetermined transmit time interval TTI. First, the delay margin measuring portion 107 increments the timer Tα by one (S41). Next, the delay margin measuring portion 107 compares the timer Tα with a predetermined update period Tα_th (S42). If the timer Tα is equal to or larger than the update period Tα_th (S42: Yes), then the delay margin measuring portion 107 finds the margin αi(t) up to allowable delay for each receiver i at the present time t; thereafter, it updates the total margin Sumαi of each receiver and the sampling number Nm of Sumαi, and finally resets the timer Tα to zero (S43). Here, the initial values of Tα, Sumαi and Nm are all zero. Further, the delay margin measuring portion 107 does not carry out the process of the step S43 if the timer Tα is smaller than the update period Tα_th (S42: No).

The margin αi(t) of a certain receiver 200 is calculated with reference to the packet having the earliest arrival time and having not finished transmission among the packets for the receiver 200 kept in the transmission buffer 102. This reference packet is referred to as the initial packet. The margin αi(t) of the receiver i is calculated with the following Formula 3.

$$\alpha i(t)=1-\{di(t)-(t-\text{tarrival}\_i(t))\}/di(t) \qquad \text{Formula 3,}$$

where t is the present time, di(t) is the allowable delay time of sending the initial packet to the receiver i, and tarrival_i(t) is the arrival time of the initial packet sent to the receiver i.

According to the above Formula 3, for example, at the arrival time of the packet, because the present time t is the same as the arrival time tarrival_i(t), αi(t) is zero. Further, thereafter, when the allowable delay time is over, because t≥tarrival_i(t)+di, αi(t) is equal to or larger than one.

Further, the following Formulas 4 and 5 are utilized to calculate the total margin of the receiver i Sumαi and the sampling number Nm of Sumαi.

$$\text{Sum}\alpha i=\text{Sum}\alpha i+\alpha i(t) \qquad \text{Formula 4; and}$$

$$Nm=Nm+1 \qquad \text{Formula 5.}$$

Next, the delay margin measuring portion 107 compares the sampling number Nm with a predetermined mean value update sampling number Nm_th (S44). If the sampling number Nm is equal to or larger than the mean value update sampling number Nm_th (S44: Yes), then the delay margin measuring portion 107 utilizes the following Formula 6 to calculate a mean value Aveαi of the margin up to the allowable delay of each receiver i, notifies the threshold value update potion 105 of the calculated result of Aveαi, and resets the Nm and the Sumαi to zero respectively (S45). The initial value of the Aveαi is zero.

$$\text{Ave}\alpha i=\text{Sum}\alpha i/Nm \qquad \text{Formula 6}$$

Further, if the sampling Nm is smaller than the mean value update sampling Nm_th (S44: No), then the delay margin measuring portion 107 ends the present process without carrying out the step S45.

FIG. 10 is a flowchart showing a detail of the step S12 in FIG. 2 in the second exemplary embodiment. The threshold value update potion 105 carries out the process shown in the flowchart of FIG. 10 at each predetermined transmit time interval TTI. First, the threshold value update potion 105 increments the timer T1 by one (S31). Next, the threshold value update potion 105 compares the timer T1 with a predetermined period T1_th (S33). As a result of the comparison, if the timer T1 is equal to or larger than the period T1_th (S33: Yes), then the threshold value update potion 105 utilizes the allocation index for each receiver notified from the scheduler 103, and the mean value Aveαi of the delay margin of each receiver notified from the delay margin measuring portion 107 to update the threshold value Th_Met_i of each receiver i by an aftermentioned method, notifies the scheduler 103 of the updated Th_Met_i, and resets the timer T1 (S51). Further, the threshold value update potion 105 ends the present process if the timer T1 is smaller than the period T1_th (S33: No).

Figure 11:
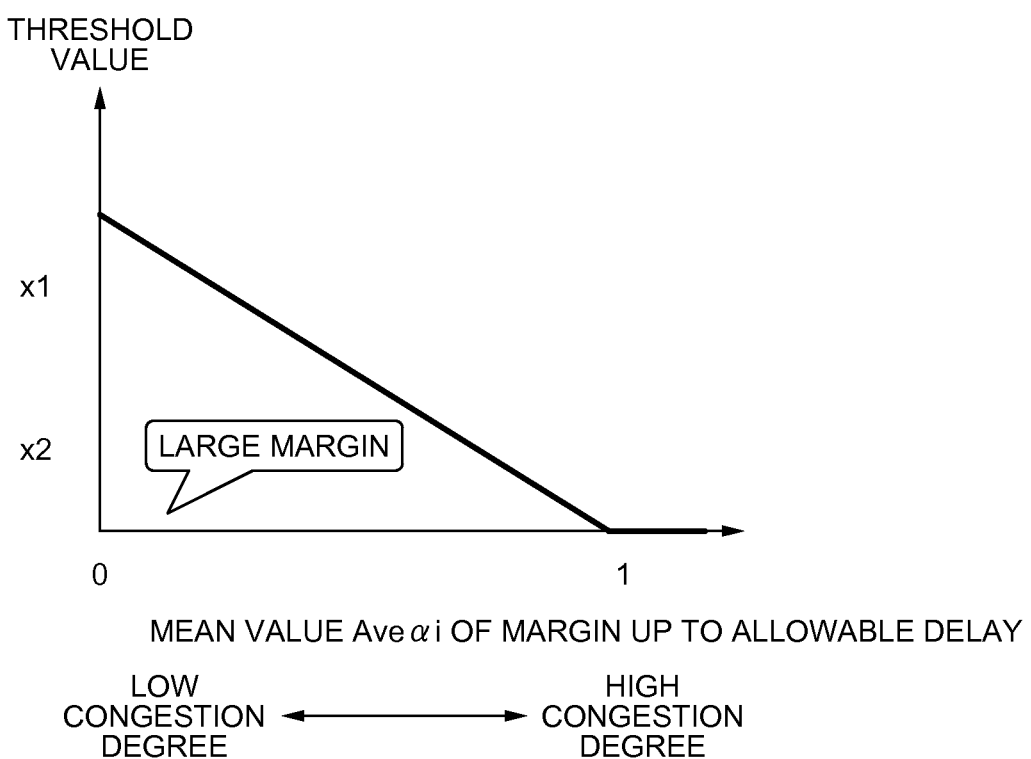
FIG. 11 shows a relationship between a mean value of a margin up to allowable delay and a threshold value in accordance with the second exemplary embodiment of the present invention.

Next, referring to FIG. 11, a method for updating the threshold value Th_Met_i of the receiver i will be explained by utilizing the allocation index and the mean value of delay margin Aveαi for the receiver i. In the example of FIG. 11, the threshold value update potion 105 updates the threshold value Th_Met_i by different methods for the case of the mean value of delay margin Aveαi of the receiver i being equal to or larger than one, and for the case of that being smaller than one.

If the mean value of delay margin Aveαi of the receiver i is smaller than one, then the threshold value update potion 105 utilizes a monotonically decreasing function "f(Aveαi)" to calculate the threshold value Th_Met_i for the mean value of delay margin Aveαi of the receiver i. In particular, the threshold value Th_Met_i is taken to be, for example, the value of the function "f(Aveαi)" multiplied by the allocation index for the receiver i. By virtue of this, the smaller the Aveαi, the larger the Th_Met_i in value, whereas the larger the Ave$\alpha$i, the smaller the Th_Met_i in value.

If the mean value of delay margin Ave$\alpha$i of the receiver i is small, then the possibility for congestion to occur is low. Thereby, congestion is still unlikely to occur even if the threshold value Th_Met_i is increased to allocate wireless resources only to the receivers with a better channel quality. Therefore, for the receiver i with a small mean value of delay margin Ave$\alpha$i, in order to further improve the power-saving effect, the threshold value Th_Met_i is set to be a large value.

On the other hand, if the mean value of delay margin Ave$\alpha$i of the receiver i is large, then the possibility for congestion to occur is high. Thereby, congestion is likely to occur if the threshold value Th_Met_i is increased to allocate wireless resources only to the receivers with a better channel quality. Therefore, for the receiver i with a large mean value of delay margin Ave$\alpha$i, in order to prevent the occurrence of congestion, the threshold value Th_Met_i is set to be a small value.

If the mean value of delay margin Ave$\alpha$i of the receiver i is equal to or larger than one, then the threshold value update potion 105 sets the threshold value Th_Met_i to be zero. In this case, all the resources become the allocation candidates for the receiver i. By virtue of this, it is possible to prevent the occurrence of congestion.

In the above manner, according the second exemplary embodiment, by utilizing the delay margin as the congestion degree, it is possible to realize the power saving while restricting transmission delay to a predetermined value or lower.

Figure 12:
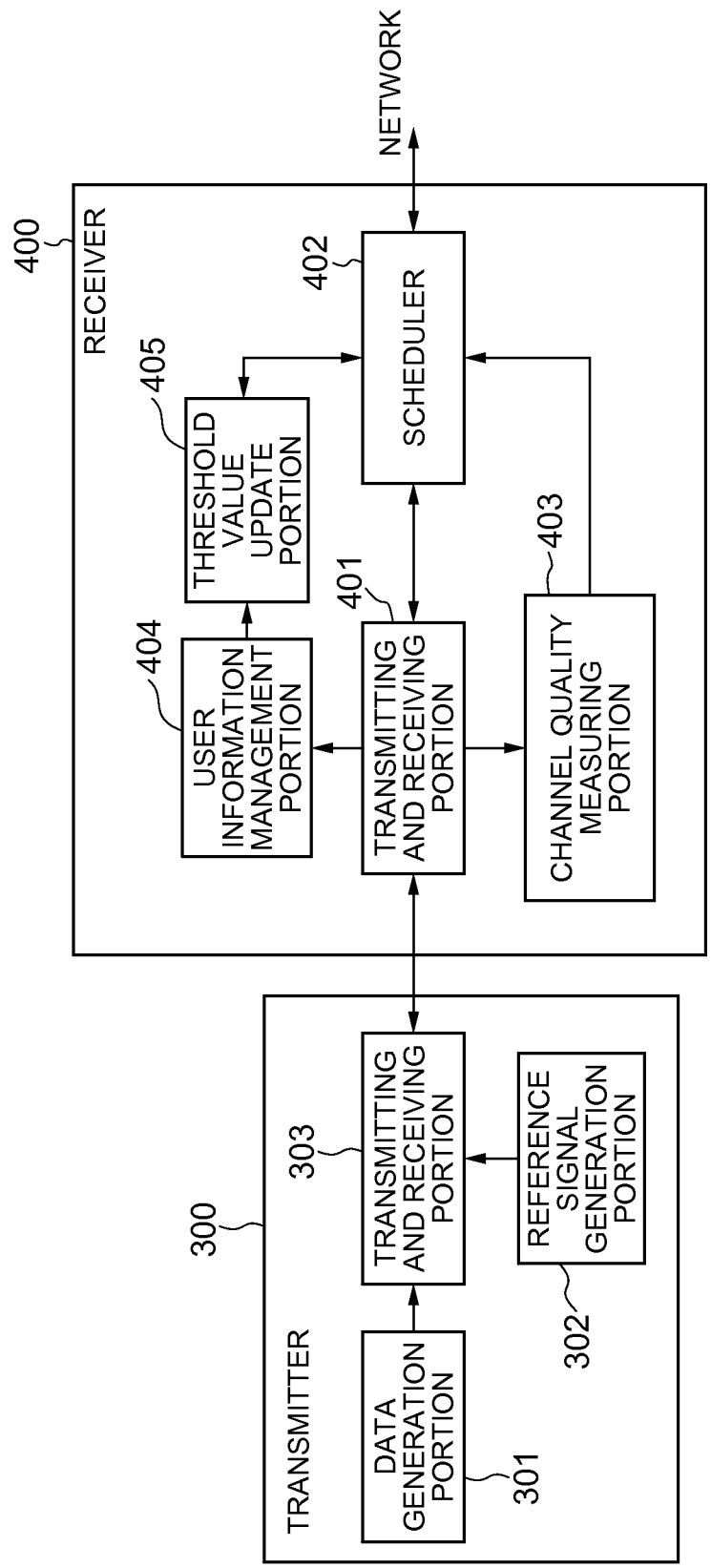
FIG. 12 is a block diagram showing a configuration of a wireless communication system in accordance with a third exemplary embodiment of the present invention.

<A Third Exemplary Embodiment>
[Configurational Explanation]
FIG. 12 is a block diagram showing a configuration of a wireless communication system in accordance with a third exemplary embodiment of the present invention. Referring to FIG. 12, the wireless communication system includes a plurality of transmitters 300, and at least one receiver 400. The transmitter 300 is connected with the receiver 400 via a wireless link (not shown). Further, the receiver 400 is connected to a network (not shown). Further, although the receiver 400 is connected with one transmitter 300 in FIG. 12, generally, it is possible to connect the receiver 400 with a plurality of transmitters 300. The transmitter 300 corresponds to a terminal (a mobile station) of the wireless communication system, while the receiver 400 corresponds to a wireless base station device of the wireless communication system. Further, the transmitter 300 corresponds to a first communication device, while the receiver 400 corresponds to a second communication device.

In the third exemplary embodiment, explanations will be made with an example of uplink (transmission from terminal to base station) of LTE. The access method is supposed to be SC-FDMA (Single Carrier-FDMA), and the minimum bandwidth for SC-FDMA allocation is regarded as one wireless resource. Further, in the third exemplary embodiment, the transmitters 300 are the users.

The transmitter 300 is composed of a data generation portion 301, a reference signal generation portion 302, and a transmitting and receiving portion 303.

The data generation portion 301 has a function of generating data. Further, the data generation portion 301 has a buffer with a function of accumulating the generated data mentioned above along with management information for the data in the buffer. The management information for the data includes the time of generating the data, the data size, and the like.

The reference signal generation portion 302 has a function of generating a reference signal at a predetermined time for measuring the channel quality of the receiver 400, and sending the same to the transmitting and receiving portion 303.

The transmitting and receiving portion 303 has a function of reporting to the receiver 400 at a predetermined time with the management information such as the data size and the like accumulated in the buffer of the data generation portion 301. Further, the transmitting and receiving portion 303 has a function of sending the reference signal generated in the reference signal generation portion 302 to the receiver 400. Further, the transmitting and receiving portion 303 has a function of sending the data accumulated in the buffer of the data generation portion 302 to the receiver 400 according to scheduling information notified from the receiver 400.

The receiver 400 is composed of a transmitting and receiving portion 401, a scheduler 402, a channel quality measuring portion 403, a user information management portion 404, and a threshold value update portion 405.

The transmitting and receiving portion 401 has a function of notifying the user information management portion 404 of the management information for each transmitter reported from the transmitter 300. Further, the transmitting and receiving portion 401 has a function of extracting the data size of each transmitter from the management information of each transmitter reported from the transmitter 300, and notifying the scheduler 402 of the same. Further, the transmitting and receiving portion 401 has a function of measuring the level of the reference signal received from the transmitter 300, and notifying the channel quality measuring portion 403 of the same. Further, the transmitting and receiving portion 401 has a function of notifying the transmitter 300 of the scheduling information decided by the scheduler 402.

The scheduler 402 has a function of calculating the allocation index for the transmitter 300 by utilizing the information of channel quality of the transmitter 300 notified from the channel quality measuring portion 403. Further, the scheduler 402 has a function of notifying the threshold value update portion 405 of the allocation index calculated above for each transmitter 300. Further, the scheduler 402 has a function of determining whether or not to let the wireless resource be a candidate allocated to the transmitter 300 by comparing the allocation index for the transmitter 300 with the threshold value of the transmitter 300 notified from the threshold value update portion 405. Further, the scheduler 402 has a function of allocating the wireless resource to the transmitter and creating the scheduling information based on the data size of each transmitter, and notifying the transmitter of the same.

The channel quality measuring portion 403 has a function of measuring the channel quality of each transmitter 300 based on the reference signal level of the transmitter 300 notified from the transmitting and receiving portion 401, and notifying the scheduler 402 of the same.

The user information management portion 404 has a function of measuring the congestion degree of communication from the transmitter 300 to the receiver 400 and notifying the threshold value update portion 405 of the same. The congestion degree measured by the user information management portion 404 is a numerical value indicating how much the probability is for the congestion to occur in communication from the transmitter 300 to the receiver 400. The larger the numerical value of the congestion degree, the higher the probability for the congestion to occur. The user information management portion 404 measures the congestion degree based on the condition of accumulating the transmission data of each transmitter 300. In particular, the user information management portion 404 has a function of calculating the mean value of the number of transmitters having transmission data in the buffer of data generation portion 301 based on the management information of each transmitter notified from the transmitting and receiving portion 401, and taking the calculation result as the congestion degree to notify the threshold value update portion 405.

The threshold value update portion 405 has a function of calculating a threshold value of the channel quality allowing for allocation by utilizing the mean value of the number of transmitters indicating the congestion degree, and the allocation index for each transmitter notified from the scheduler 402, and notifying the scheduler 402 of the same. The threshold value update portion 405 in the third exemplary embodiment calculates the threshold value for common utilization among the plurality of transmitters 300.

[Operational Explanation]

Next, referring to the figure, detailed explanations will be made with respect to an operation of the third exemplary embodiment shown in FIG. 12.

Figure 13:
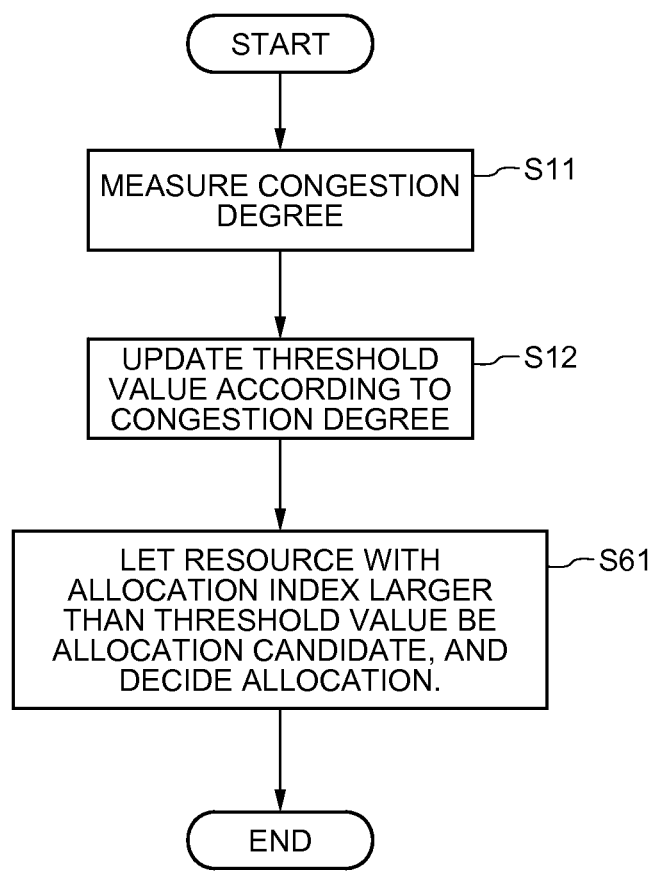
FIG. 13 is a flowchart showing an outline of an overall operation procedure in accordance with the third exemplary embodiment of the present invention.

FIG. 13 shows an outline of an overall operation procedure of the receiver 400 from updating the threshold value as the reference for allocating a wireless resource, up to allocating, then, the wireless resource to the transmitter 300 based on the threshold value.

First, the user information management portion 404 calculates the mean value AveNu of the number of the transmitters 300 having transmission data in the buffer of the data generation portion 301, and notifies the threshold value update portion 405 of this AveNu as the congestion degree (S11).

Next, the threshold value update portion 405 updates the threshold value Th Met of the channel quality allowing for allocating the wireless resource according to the notified AveNu indicating the congestion degree, and notifies the scheduler 402 of the same (S12).

Next, the scheduler 402 compares the allocation index for each transmitter 300 with the threshold value Th_Met, and lets the wireless resources with the allocation index for the transmitter 300 equal to or larger than the threshold value Th Met to be candidates of wireless resources allocated to the transmitters 300. Next, the scheduler 402 decides the transmitter 300 for actually allocating the wireless resource candidate. If there are a plurality of transmitters 300 for the same one wireless resource candidate, then, for example, it is preferentially allocated to the transmitter with a higher channel quality. Next, the scheduler 402 creates the scheduling information for each transmitter 200 based on the allocation result, and sends the same to the transmitter 300 (S13). Because the uplink is the object here, the scheduler 402 only carries out the allocation of wireless resources, while the transmitter 300 carries out the data transmission according to the above scheduling information.

Next, the steps S11 and S12 will be explained in detail.

Figure 14:
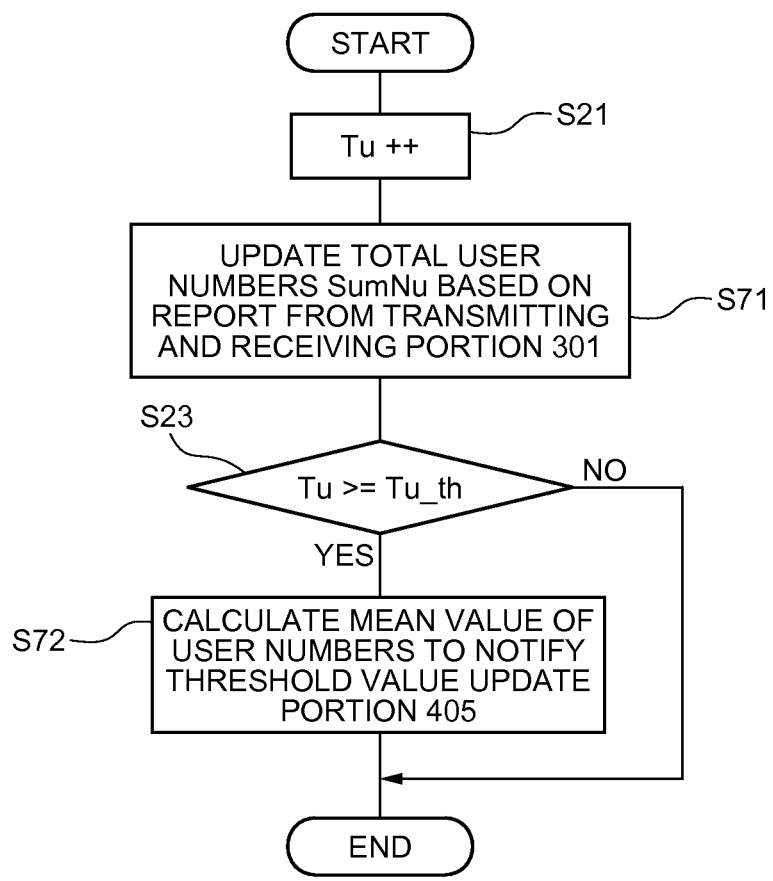
FIG. 14 is a flowchart showing an operation procedure of a user information management portion in accordance with the third exemplary embodiment of the present invention.

FIG. 14 is a flowchart showing a detail of the step S11 in FIG. 13 in accordance with the third exemplary embodiment. The user information management portion 404 carries out the process shown in the flowchart of FIG. 14 at each predetermined transmit time interval TTI. First, the user information management portion 404 increments the timer Tu by one (S21). Next, the user information management portion 404 measures the number Nu(Tu) of the transmitters 300 having transmission data based on the management information reported from the transmitting and receiving portion 401, and updates the total user numbers SumNu according to the aforementioned Formula 1 (S71). The initial values of Tu and SumNu are both zero. Next, the user information management portion 404 compares Tu with Tu_th and, if Tu is equal to or larger than Tu_th (S23: Yes), then it calculates the mean value of the user numbers AveNu with the aforementioned Formula 2, notifies the threshold value update portion 405 of the same, and resets Tu and SumNu (S72). Further, the user information management portion 404 ends the present process if Tu is smaller than Tu_th (S23: No).

Figure 15:
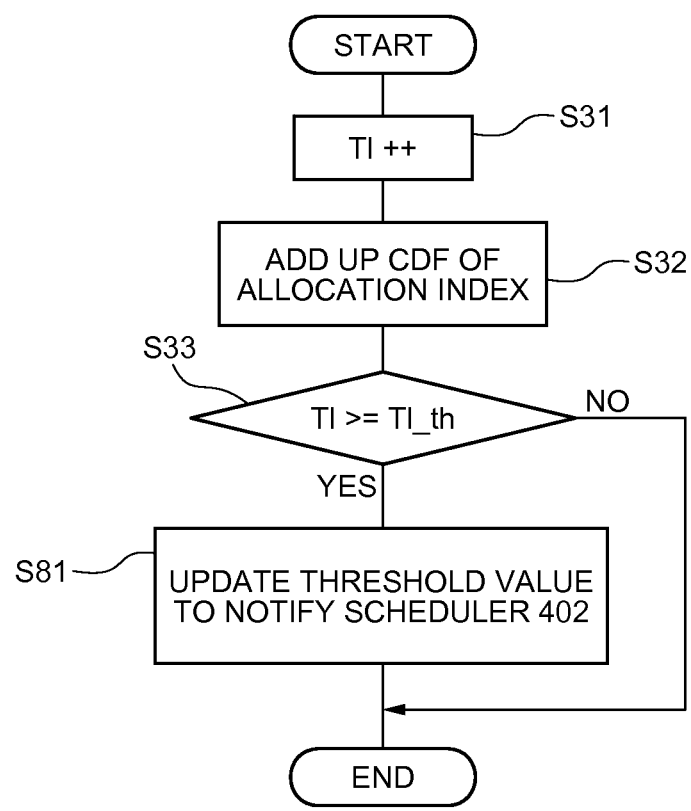
FIG. 15 is a flowchart showing an operation procedure of a threshold value update portion in accordance with the third exemplary embodiment of the present invention.

FIG. 15 is a flowchart showing a detail of the step S12 in FIG. 13 in accordance with the third exemplary embodiment. The threshold value update portion 405 carries out the process shown in the flowchart of FIG. 15 at each predetermined transmit time interval TTI. First, the threshold value update portion 405 increments the timer T1 by one (S31). Next, the threshold value update portion 405 adds up CDF of the allocation index (S32). Then, the threshold value update portion 405 compares the timer T1 with a predetermined period T1_th and, if the timer T1 is equal to or larger than the period T1_th (S33: Yes), then it utilizes the CDF of the allocation index, and the AveNu notified from the user information management portion 404 to update the threshold value Th_Met by an aftermentioned method, notifies the scheduler 402 of the updated Th_Met, and resets the timer T1 and the added-up CDF (S81). Further, the threshold value update portion 405 ends the present process if the timer T1 is smaller than the period T1_th (S33: No).

The method for updating the threshold value Th_Met is the same as in the first exemplary embodiment as from CDF of the allocation index and the mean value AveNu of the users (the transmitters 300) having transmission data. That is, the value of the parameter p is decided from the mean value of the user numbers AveNu, and the threshold value Th_Met is updated to be the value at p% of the CDF of the allocation index. By virtue of this, the smaller the mean value of the user numbers AveNu, the larger the threshold value Th_Met, whereas the larger the mean value of the user numbers AveNu, the smaller the threshold value Th_Met.

In the third exemplary embodiment, if the mean value of the user numbers AveNu is small, that is, if the number of the transmitters 300 with the transmission data accumulated in the buffer of the data generation portion 301 is small, then the possibility for congestion to occur is low. Thereby, congestion is still unlikely to occur even if the threshold value Th_Met is increased to allocate wireless resources only to the transmitters 300 with a better channel quality.

Therefore, when the mean value of the user numbers AveNu is small, in order to further improve the power-saving effect, the threshold value Th_Met is set to be a large value.

On the other hand, if the mean value of the user numbers AveNu is large, that is, if the number of the transmitters 300 with the transmission data accumulated in the buffer of the data generation portion 301 is large, then the possibility for congestion to occur is high. Thereby, congestion is likely to occur if the threshold value Th_Met is increased to allocate wireless resources only to the transmitters 300 with a better channel quality. Therefore, when the mean value of the user numbers AveNu is large, in order to prevent the occurrence of congestion, the threshold value Th_Met is set to be a small value.

In the above manner, according the third exemplary embodiment, it is still possible to achieve the power-saving effect while restraining the occurrence of congestion even with the uplink in the wireless communication system (transmission from terminal to base station).

<A Fourth Exemplary Embodiment>

[Configurational Explanation]

Figure 16:
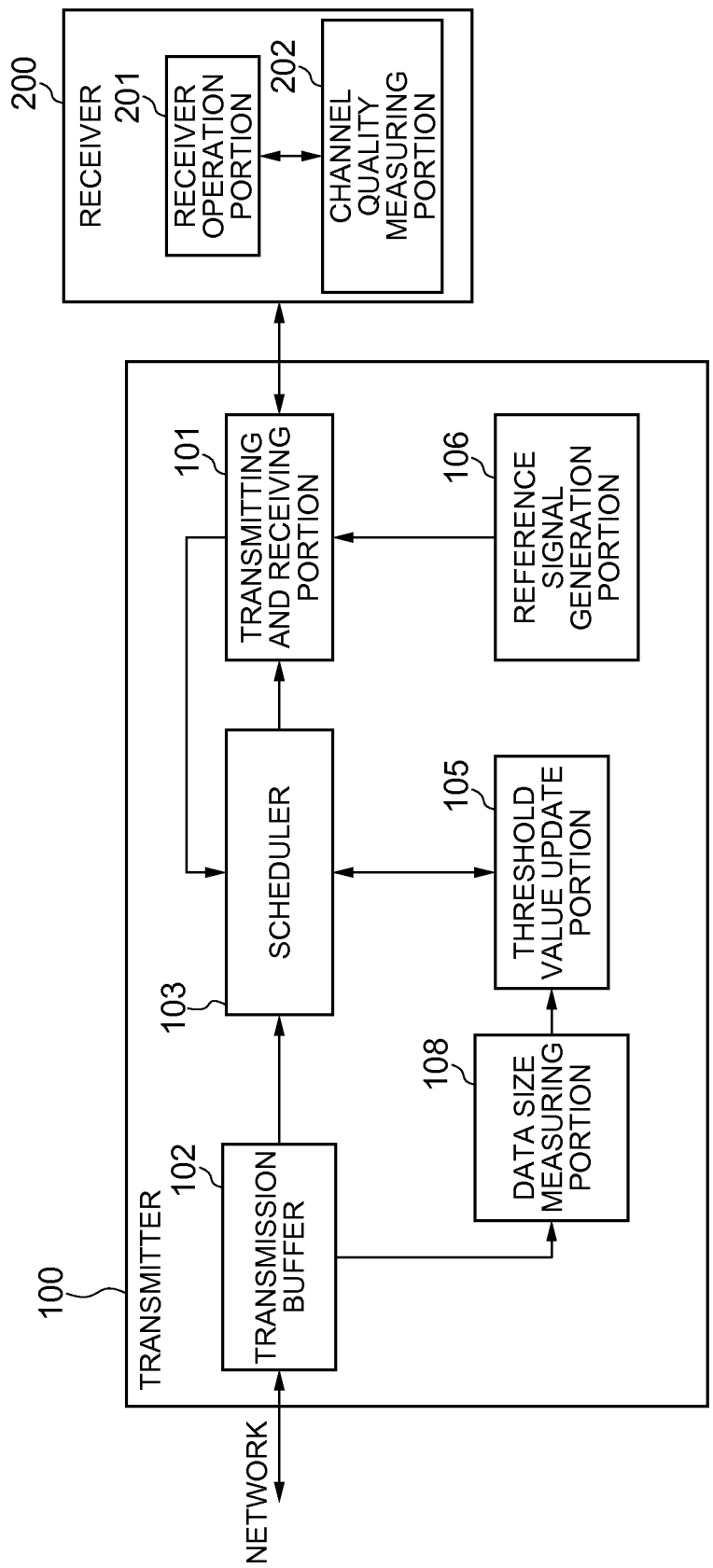
FIG. 16 is a block diagram showing a configuration of a wireless communication system in accordance with a fourth exemplary embodiment of the present invention.

Next, referring to the figures, a fourth exemplary embodiment of the present invention will be explained in detail. FIG. 16 shows a configuration of a wireless communication system in accordance with the fourth exemplary embodiment. Referring to FIG. 16, the fourth exemplary embodiment is different from the first exemplary embodiment of FIG. 1 in the aspect that the transmitter 100 has a data size measuring portion 108 instead of the user number measuring portion 104. In the fourth exemplary embodiment, in common with the first exemplary embodiment, the user is a receiver. Further, the receiver 200 corresponds to a terminal (a mobile station) of the wireless communication system, while the transmitter 100 corresponds to a wireless base station device of the wireless communication system. Further, the receiver 200 corresponds to a first communication device, while the transmitter 100 corresponds to a second communication device. Further, in the fourth exemplary embodiment, explanations will be made with an example of allocating wireless resources for downlink (transmission from base station to terminal).

The data size measuring portion 108 has a function of measuring the congestion degree and notifying the threshold value update potion 105 of the same. The congestion degree measured by the data size measuring portion 108 is a numerical value indicating how much the probability is for the congestion to occur in communication from the transmitter 100 to the receiver 200. The larger the numerical value of the congestion degree, the higher the probability for the congestion to occur. The data size measuring portion 108 calculates the mean value of the size of the data accumulated in the transmission buffer 102 waiting for transmission, and takes the calculation result as the congestion degree to notify the threshold value update potion 105.

The threshold value update potion 105 has a function of calculating the threshold value for determining whether or not to let the wireless resource be a candidate allocated to the receiver 200 by utilizing the mean value of the size of the data waiting for transmission notified from the data size measuring portion 108, and the allocation index for each receiver 200 notified from the scheduler 103, and notifying the scheduler 103 of the same.

[Operational Explanation]

Figure 17:
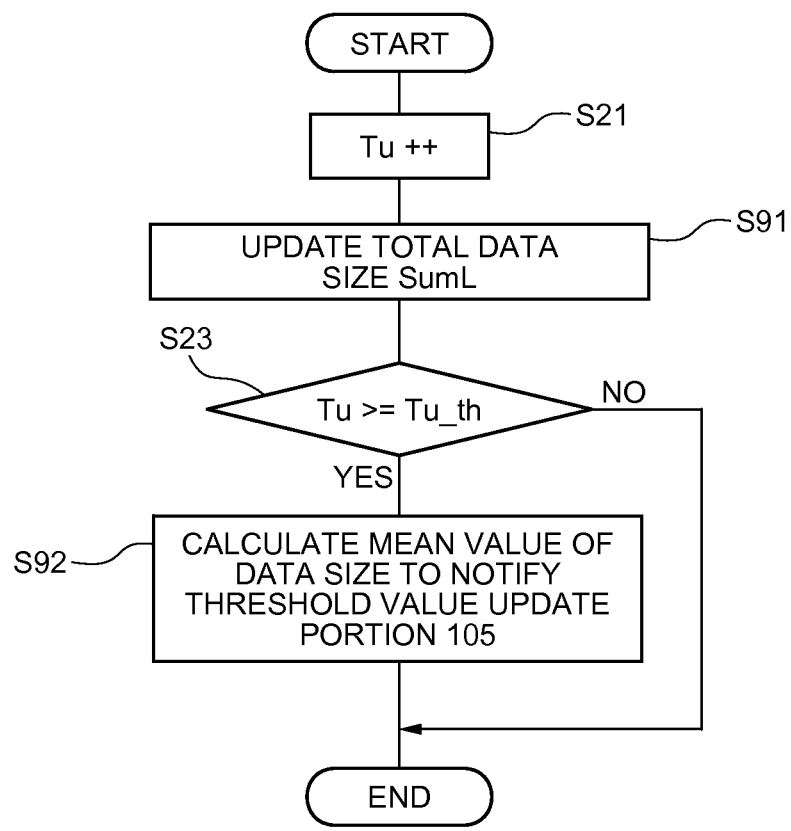
FIG. 17 is a flowchart showing an operation procedure of a data size measuring portion in accordance with the fourth exemplary embodiment of the present invention.
Figure 18:
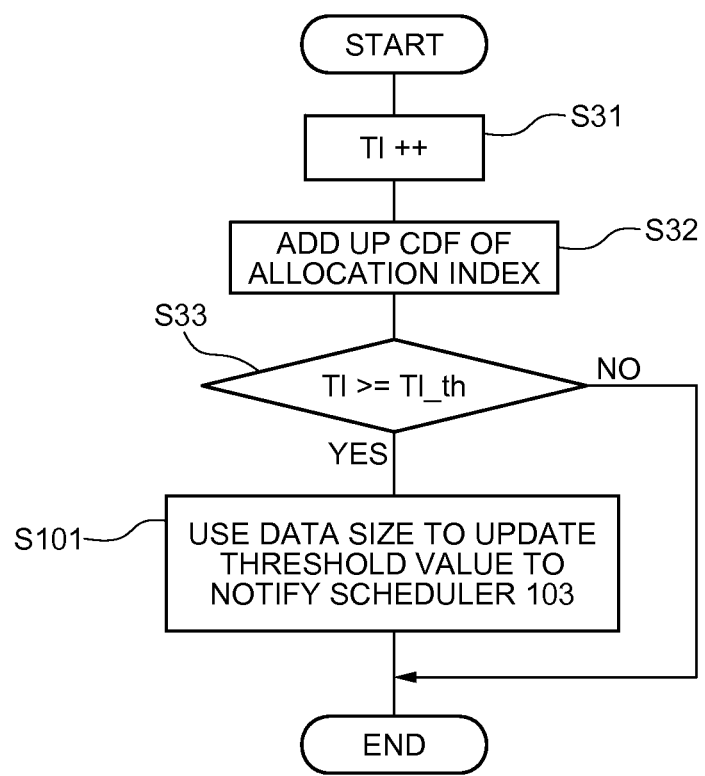
FIG. 18 is a flowchart showing an operation procedure of a threshold value update portion in accordance with the fourth exemplary embodiment of the present invention.

Next, referring to the figure, explanations will be made with respect to an operation of the fourth exemplary embodiment focused on the differences from that of the first exemplary embodiment. In the fourth exemplary embodiment, in common with the first exemplary embodiment, FIG. 2 shows the outline of an overall operation procedure of the transmitter 100 from updating the threshold value, up to allocating the wireless resource based on the threshold value. In the fourth exemplary embodiment, the flowchart in FIG. 17 shows a detail of the step (S11) for measuring the congestion degree, while the flowchart in FIG. 18 shows a detail of the step (S21) for updating the threshold value. Hereinbelow, each of the steps will be explained in detail.

FIG. 17 is a flowchart showing a detail of the step S11 in FIG. 2 in accordance with the fourth exemplary embodiment. The data size measuring portion 108 carries out the process shown in the flowchart of FIG. 17 at each predetermined transmit time interval TTI. First, the data size measuring portion 108 increments the timer Tu by one (S21). Next, the data size measuring portion 108 measures the total value L(Tu) of the size of all users' (receivers') data accumulated in the transmission buffer 102, and updates the total data size SumL according to the Formula 7 shown below (S91). The initial values of Tu and SumL are both zero.

$$SumL = SumL + L(Tu) \qquad \text{Formula 7}$$

Next, the data size measuring portion 108 compares the timer Tu with a predetermined period Tu_th and, if the timer Tu is equal to or larger than the period Tu_th (S23: Yes), then it calculates the mean value of the data size AveL with the Formula 8 shown below, notifies the threshold value update potion 105 of the calculation result of AveL, and resets the timer Tu and SumL (S92).

$$AveL = SumL / Tu \qquad \text{Formula 8}$$

Further, the data size measuring portion 108 ends the present process if the timer Tu is smaller than the period Tu_th (S23: No).

FIG. 18 is a flowchart showing a detail of the step S12 in FIG. 2. The threshold value update potion 105 carries out the process shown in the flowchart of FIG. 18 at each predetermined transmit time interval TTI. First, the threshold value update potion 105 increments the timer T1 by one (S31). Next, the threshold value update potion 105 adds up CDF of the allocation index for each receiver notified from the scheduler 103 (S32). Then, the threshold value update potion 105 compares the timer T1 with a predetermined period T1_th and, if the timer T1 is equal to or larger than the period T1_th (S33: Yes), then it utilizes the CDF of the allocation index, and the AveL notified from the data size measuring portion 108 to update the threshold value Th_Met, notifies the scheduler 103 of the updated Th_Met, and resets the timer T1 and the added-up CDF (S101). Further, the threshold value update potion 105 ends the present process if the timer T1 is smaller than the period T1_th (S33: No).

Figure 19:
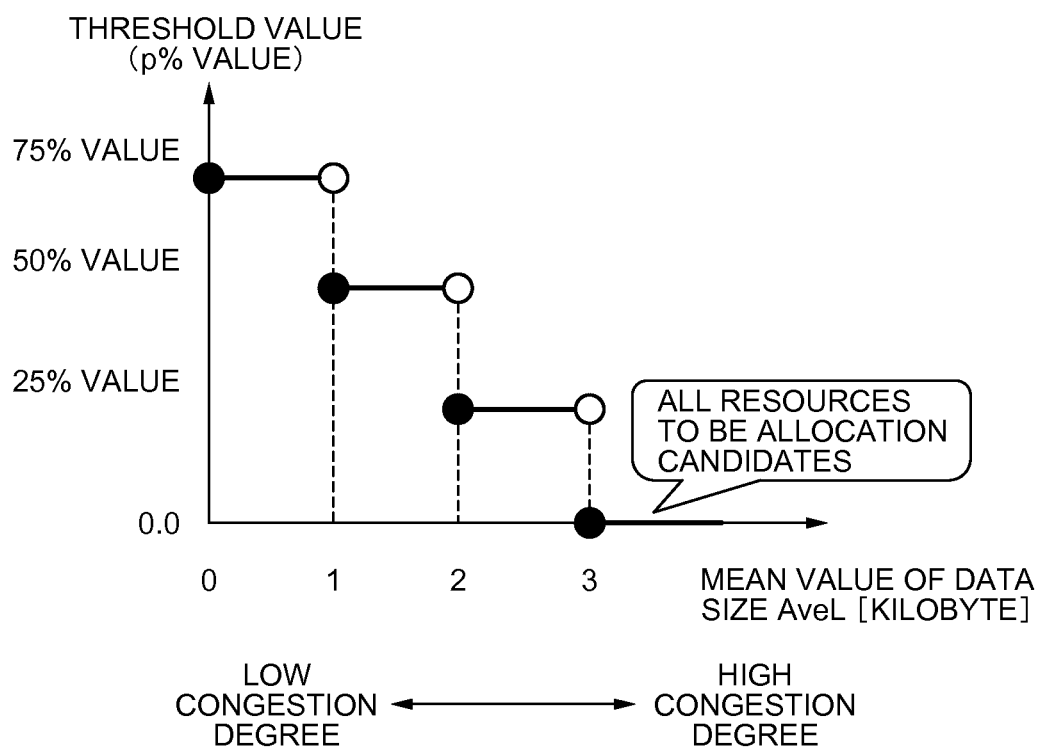
FIG. 19 shows a relationship between a mean value of a data size and a threshold value in accordance with the fourth exemplary embodiment of the present invention.
Figure 20:
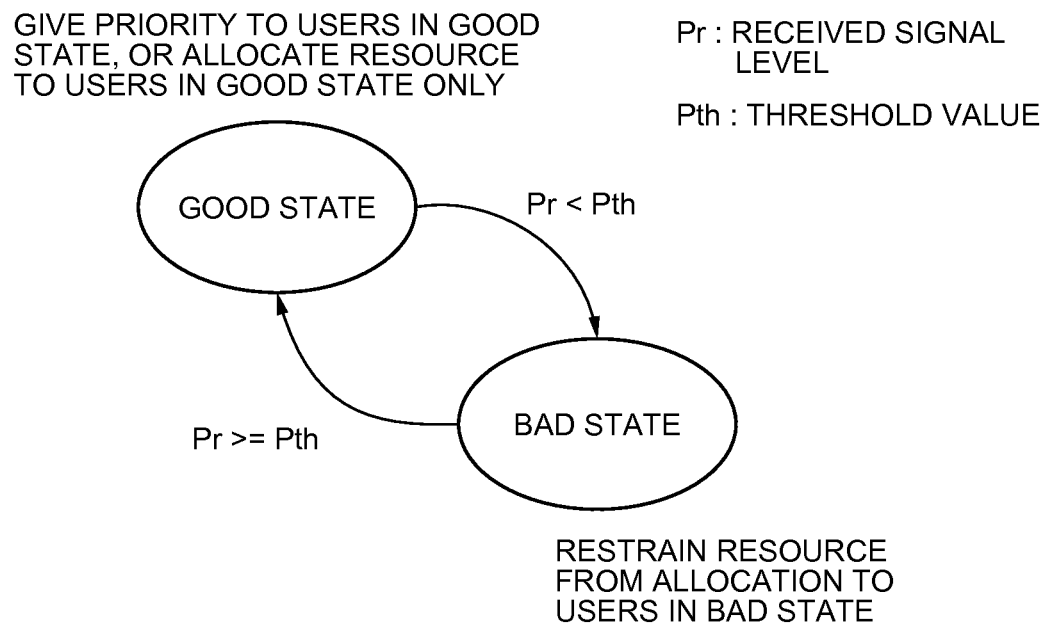
FIG. 20 shows a channel model utilized in conventional power-saving schedulers.
Figure 21B:
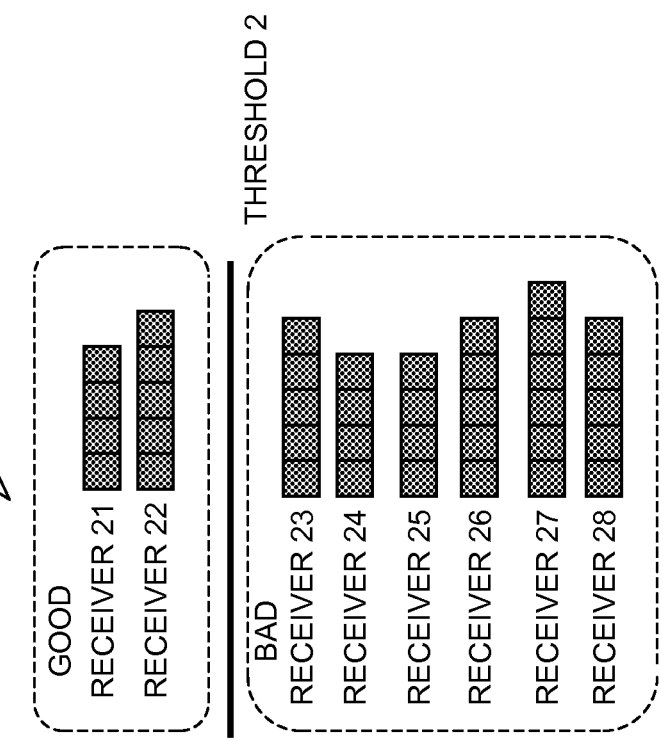
FIGS. 21A and 21B present a problem with power-saving schedulers utilizing preset threshold values.
Figure 21A:
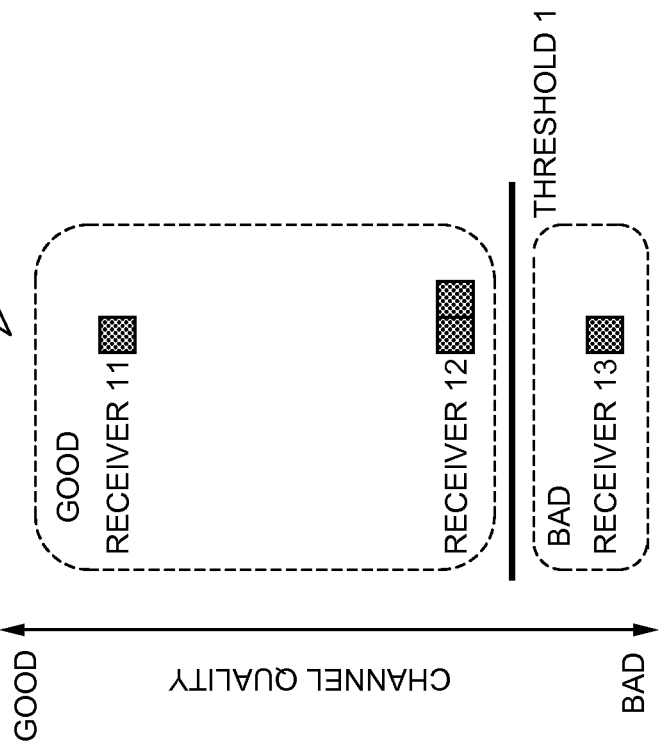

Next, referring to FIG. 19, a method for updating the threshold value Th_Met will be explained by utilizing the CDF of the allocation index, and the mean value of data size AveL.

In the fourth exemplary embodiment, the value of the parameter p is decided from the mean value of data size AveL, and the threshold value Th_Met is updated to be the value at p% of the CDF of the allocation index. As shown in FIG. 19, the value of the parameter p is decided from the mean value of data size AveL. In FIG. 19, the smaller the mean value of data size AveL, the larger the value of setting the parameter p, whereas the larger the mean value of data size AveL, the smaller the value of setting the parameter p.

If the mean value of data size AveL is small, that is, if the amount of transmission data accumulated in the transmission buffer 102 is small, then the possibility for congestion to occur is low. Thereby, congestion is still unlikely to occur even if the threshold value Th_Met is increased to allocate wireless resources only to the receivers 200 with a better channel quality. Therefore, when the mean value of data size AveL is small, in order to further improve the power-saving effect, the threshold value Th_Met is set to be a large value.

On the other hand, if the mean value of data size AveL is large, that is, if the amount of transmission data accumulated in the transmission buffer 102 is large, then the possibility for congestion to occur is high. Thereby, congestion is likely to occur if the threshold value Th_Met is increased to allocate wireless resources only to the receivers 200 with a better channel quality. Therefore, when the mean value of data size AveL is large, in order to prevent the occurrence of congestion, the threshold value Th_Met is set to be a small value.

In the above manner, according the fourth exemplary embodiment, by utilizing the size of the data waiting for transmission as the congestion degree, it is possible to realize the power saving to the maximum extent possible while restricting the size of the data waiting for transmission to a predetermined value or lower.

In the fourth exemplary embodiment, although the explanations were made with an example of downlink (communication from base station to terminal), the present invention is not limited to it but may as well be applied to uplink (communication from terminal to base station). If it is applied to uplink, then L(Tu) is the total value of the size of data accumulated in the transmission buffer of a terminal acting as a transmitter.

<Other Exemplary Embodiments of the Present Invention>

Hereinabove, explanations are made with respect to a few exemplary embodiments in accordance with the present invention. However, the present invention should not be limited to the above-mentioned exemplary embodiments. For example, as the congestion degree, the number of users having data in the transmission buffer is utilized in the first and third exemplary embodiments, the margin up to the allowable delay is utilized in the second exemplary embodiment, and the total value of the data size is utilized in the fourth exemplary embodiment, respectively. However, the present invention is not limited to the above configurations but may as well utilize, for example, the number S of all packets occurring in a predetermined observing time and the number B of the packets whose transmission is not finished in a predetermined delay time, and take the dissatisfaction rate found by the following Formula 9 as the congestion degree.

$$\text{Dissatisfaction rate}=B/S \qquad \text{Formula 9}$$

By utilizing the above dissatisfaction rate as the congestion degree, it is possible to realize the power saving to the maximum extent possible while restricting the dissatisfaction rate to a predetermined value or lower.

Further, by utilizing a target rate R and an average transmission rate T, the congestion degree may as well utilize the mean margin against the target rate R found by the following Formula 10. In this case, the more the room in transmission is, the narrower the rate margin becomes.

$$\text{Rate margin}=R/T \qquad \text{Formula 10}$$

In this manner, by utilizing the rate margin as the congestion degree, it is possible to realize the power saving to the maximum extent possible while controlling the average rate not to be under the requested rate.

The congestion degree explained above is calculated as the mean value of all receivers in the case of calculating the threshold value common to all receivers as in the first exemplary embodiment. Further, it is measured according to each receiver in the case of setting the threshold value for each receiver as in the second exemplary embodiment. It is possible to reduce the processing load for calculating the threshold value by setting it to a common value regardless of the combinations of receivers and transmitters. Further, by setting the threshold value according to each combination of the receiver and transmitter, it is possible to optimally carry out the power-saving control for each combination. Thereby, compared with the case of setting it to a common value, it is possible to enhance the power-saving effect.

Further, in the first, third and fourth exemplary embodiments, the threshold value Th_Met is updated by adding up the CDF of the allocation index, and selecting the p% value of the CDF according to the congestion degree. In this manner, by updating the threshold value utilizing the CDF, there is an advantage of allowing the threshold value to be set based on a statistical evaluation of a short-term channel quality of a terminal with its own cell.

Further, in the second exemplary embodiment, the threshold value is updated by utilizing a monotonically decreasing function according to the congestion degree. By updating the threshold value utilizing a monotonically decreasing function in such a manner, compared with the case of utilizing the CDF, it is possible to reduce the processing load. Further, when setting the parameter of the function based on a long-term traffic load, it is possible to set the threshold value based on the long-term traffic load.

However, the present invention is not limited to the above configuration but may as well update the threshold value by calculating an offset value Am to the reference value M according to the congestion degree such that the threshold value is defined by the following Formula 11. By updating the threshold value utilizing an offset value in this manner, it is possible to reduce the processing load for updating the threshold value.

$$\text{Threshold value}=M+\Delta m \qquad \text{Formula 11}$$

Further, the threshold value may as well be updated by increasing and decreasing an offset value Δa to the threshold value at the present time t (Threshold value (t)) according to the congestion degree as defined by the following Formula 12. By utilizing a step value to update the threshold value in this manner, it is possible to reduce the processing load for updating the threshold value.

$$\text{Threshold value }(t+T)=\text{Threshold value }(t)+\Delta a \qquad \text{Formula 12}$$

Further, the above-mentioned threshold value is updated according to each receiver in the second and third exemplary embodiments and according to each transmitter in the fourth exemplary embodiment. However, the present invention is not limited to the above configurations. The threshold value may as well be updated according to each data flow when the scheduling is performed for each data flow but not for each user. In this manner, by setting the threshold value according to each data flow, compared with the case of setting it according to each combination of the transmitter and receiver, it is possible to further enhance the power-saving effect.

Further, in each of the above-mentioned exemplary embodiments, although the explanations are made with the example of OFDMA taking a frequency band as the wireless resource for the communication system, the present invention is not limited to this example. It is possible to apply the present invention to TDMA (Time Division Multiple Access) taking a time slot as the wireless resource as well. Further, it is also possible to apply the present invention to SDMA (Space Division Multiple Access) taking a spatial segment as the wireless resource.

While the present invention has been particularly shown and described with reference to each of the above-mentioned exemplary embodiments, the present invention is not limited to these embodiments. It will be understood by those of ordinary skill in the art that various changes in form and details may be made therein without departing from the spirit and scope of the present invention as defined by the claims.

Further, the present application claims priority from Japanese Patent Application No. 2009-291665, filed on Dec. 24, 2009 in Japan, the disclosure of which is incorporated herein by reference in its entirety.

The whole or part of the exemplary embodiment disclosed above can be described as, but not limited to, the following supplementary notes.

(Supplementary Note 1)

An allocable wireless resource selection method for a wireless communication system including a first communication device or devices, and a second communication device in wireless communication with the first communication device, the selection method comprising:

calculating an index value according to each of the first communication devices for determining whether or not to let a wireless resource utilized for communications between the first communication device and the second communication device be a candidate allocated to the first communication device, based on the quality of a channel between the first communication device and the second communication device;

measuring a congestion degree between the first communication device and the second communication device;

calculating a threshold value for determining whether or not to let the wireless resource be the candidate allocated to the first communication device, based on the measured congestion degree; and comparing the index value with the threshold value to determine whether or not to let the wireless resource be the candidate allocated to the first communication device.

(Supplementary Note 2)

The allocable wireless resource selection method according to Supplementary Note 1, wherein the index value is calculated according to each combination of the first communication device and the wireless resource.

(Supplementary Note 3)

The allocable wireless resource selection method according to Supplementary Note 1 or 2, wherein the second communication device is a base station of the wireless communication system, the first communication device is a terminal of the wireless communication system, and the wireless resource is utilized for transmission from the second communication device to the first communication device.

(Supplementary Note 4)

The allocable wireless resource selection method according to Supplementary Note 1 or 2, wherein the second communication device is a base station of the wireless communication system, the first communication device is a terminal of the wireless communication system, and the wireless resource is utilized for transmission from the first communication device to the second communication device.

(Supplementary Note 5)

The allocable wireless resource selection method according to any of Supplementary Notes 1 to 4, wherein in measuring the congestion degree, a value corresponding to the number of the first communication devices having communication data is measured as the congestion degree.

(Supplementary Note 6)

The allocable wireless resource selection method according to any of Supplementary Notes 1 to 4, wherein in measuring the congestion degree, a margin of delay calculated from the delay time and allowable delay time of the data waiting for transmission is measured as the congestion degree.

(Supplementary Note 7)

The allocable wireless resource selection method according to any of Supplementary Notes 1 to 4, wherein in measuring the congestion degree, a value corresponding to the size of the data waiting for transmission is measured as the congestion degree.

(Supplementary Note 8)

The allocable wireless resource selection method according to any of Supplementary Notes 1 to 4, wherein in measuring the congestion degree, a dissatisfaction rate is measured as the congestion degree, indicating a probability of failing to finish sending the communication data within a predetermined delay time.

(Supplementary Note 9)

The allocable wireless resource selection method according to any of Supplementary Notes 1 to 4, wherein in measuring the congestion degree, a rate margin calculated from a required rate and an average transmission rate is measured as the congestion degree.

(Supplementary Note 10)

The allocable wireless resource selection method according to any of Supplementary Notes 1 to 9, wherein in calculating the threshold value, the value of a parameter p is decided according to the congestion degree, and p% of the index value of its cumulative density function is calculated as the threshold value.

(Supplementary Note 11)

The allocable wireless resource selection method according to any of Supplementary Notes 1 to 9, wherein in calculating the threshold value, a monotonically decreasing function according to the congestion degree is utilized to calculate the threshold value.

(Supplementary Note 12)

The allocable wireless resource selection method according to any of Supplementary Notes 1 to 9, wherein in calculating the threshold value, the threshold value is calculated by calculating an offset value according to the congestion degree and adding the offset value to a reference value.

(Supplementary Note 13)

The allocable wireless resource selection method according to any of Supplementary Notes 1 to 9, wherein in calculating the threshold value, the threshold value is calculated by selecting a step value according to the congestion degree and adding the step value to the latest threshold value.

(Supplementary Note 14)

The allocable wireless resource selection method according to any of Supplementary Notes 1 to 13, wherein in calculating the threshold value, the threshold value is calculated as a common value regardless of the combination of the first communication device and the second communication device.

(Supplementary Note 15)

The allocable wireless resource selection method according to any of Supplementary Notes 1 to 13, wherein in calculating the threshold value, the threshold value is calculated according to each combination of the first communication device and the second communication device.

(Supplementary Note 16)

The allocable wireless resource selection method according to any of Supplementary Notes 1 to 13, wherein in calculating the threshold value, the threshold value is calculated according to each data flow.

(Supplementary Note 17)

An allocable wireless resource selection device for a wireless communication system including a first communication device or devices, and a second communication device in wireless communication with the first communication device, the selection device comprising:

an index value calculation unit for calculating an index value according to each of the first communication devices for determining whether or not to let a wireless resource utilized for communications between the first communication device and the second communication device be a candidate allocated to the first communication device, based on the quality of a channel between the first communication device and the second communication device;

a congestion degree measuring unit for measuring a congestion degree between the first communication device and the second communication device;

a threshold value setting unit for calculating a threshold value for determining whether or not to let the wireless resource be the candidate allocated to the first communication device, based on the measured congestion degree; and a determination unit for comparing the index value with the threshold value to determine whether or not to let the wireless resource be the candidate allocated to the first communication device.

(Supplementary Note 18)

The allocable wireless resource selection device according to Supplementary Note 17, wherein the index value calculation unit calculates the index value according to each combination of the first communication device and the wireless resource.

(Supplementary Note 19)

The allocable wireless resource selection device according to Supplementary Note 17 or 18, wherein the second communication device is a base station of the wireless communication system, the first communication device is a terminal of the wireless communication system, and the wireless resource is utilized for transmission from the second communication device to the first communication device.

(Supplementary Note 20)

The allocable wireless resource selection device according to Supplementary Note 17 or 18, wherein the second communication device is a base station of the wireless communication system, the first communication device is a terminal of the wireless communication system, and the wireless resource is utilized for transmission from the first communication device to the second communication device.

(Supplementary Note 21)

The allocable wireless resource selection device according to any of Supplementary Notes 17 to 20, wherein the congestion degree measuring unit measures a value corresponding to the number of the first communication devices having communication data as the congestion degree.

(Supplementary Note 22)

The allocable wireless resource selection device according to any of Supplementary Notes 17 to 20, wherein the congestion degree measuring unit measures a margin of delay calculated from the delay time and allowable delay time of the data waiting for transmission as the congestion degree.

(Supplementary Note 23)

The allocable wireless resource selection device according to any of Supplementary Notes 17 to 20, wherein the congestion degree measuring unit measures a value corresponding to the size of the data waiting for transmission as the congestion degree.

(Supplementary Note 24)

The allocable wireless resource selection device according to any of Supplementary Notes 17 to 20, wherein the congestion degree measuring unit measures a dissatisfaction rate as the congestion degree, calculated as a probability of failing to finish sending the communication data within a predetermined delay time.

(Supplementary Note 25)

The allocable wireless resource selection device according to any of Supplementary Notes 17 to 20, wherein the congestion degree calculating unit measures a rate margin calculated from a required rate and an average transmission rate as the congestion degree.

(Supplementary Note 26)

A communication device in wireless communication with another communication device or devices, the communication device comprising:

an index value calculation unit for calculating an index value according to each of the other communication devices for determining whether or not to let a wireless resource utilized for communications between itself and the other communication device be a candidate allocated to the other communication device, based on the quality of a channel between itself and the other communication device;

a congestion degree measuring unit for measuring a congestion degree between itself and the other communication device;

a threshold value setting unit for calculating a threshold value for determining whether or not to let the wireless resource be the candidate allocated to the other communication device, based on the measured congestion degree; and a determination unit for comparing the index value with the threshold value to determine whether or not to let the wireless resource be the candidate allocated to the other communication device.

(Supplementary Note 27)

The communication device according to Supplementary Note 26, wherein the index value calculation unit calculates the index value according to each combination of the other communication device and the wireless resource.

(Supplementary Note 28)

The communication device according to Supplementary Note 26 or 27 further comprising a function as a base station of a wireless communication system, wherein the other communication device is a terminal of the wireless communication system, and the wireless resource is utilized for transmission from the communication device itself to the other communication device.

(Supplementary Note 29)

The communication device according to Supplementary Note 26 or 27 further comprising a function as a base station of a wireless communication system, wherein the other communication device is a terminal of the wireless communication system, and the wireless resource is utilized for transmission from the other communication device to the communication device itself.

(Supplementary Note 30)

The communication device according to any of Supplementary Notes 26 to 29, wherein the congestion degree measuring unit measures a value corresponding to the number of the other communication devices having communication data as the congestion degree.

(Supplementary Note 31)

The communication device according to any of Supplementary Notes 26 to 29, wherein the congestion degree measuring unit measures a margin of delay calculated from the delay time and allowable delay time of the data waiting for transmission as the congestion degree.

(Supplementary Note 32)

The communication device according to any of Supplementary Notes 26 to 29, wherein the congestion degree measuring unit measures a value corresponding to the size of the data waiting for transmission as the congestion degree.

(Supplementary Note 33)

The communication device according to any of Supplementary Notes 26 to 29, wherein the congestion degree measuring unit measures a dissatisfaction rate as the congestion degree, calculated as a probability of failing to finish sending the communication data within a predetermined delay time.

(Supplementary Note 34)

The communication device according to any of Supplementary Notes 26 to 29, wherein the congestion degree measuring unit measures a rate margin calculated from a required rate and an average transmission rate as the congestion degree.

(Supplementary Note 35)

A computer program comprising instructions for causing a computer constituting a communication device in wireless communication with another communication device or devices to function as:

an index value calculation unit for calculating an index value according to each of the first communication devices for determining whether or not to let a wireless resource utilized for communications between itself and the other communication device be a candidate allocated to the other communication device, based on the quality of a channel between itself and the other communication device;

a congestion degree measuring unit for measuring a congestion degree between itself and the other communication device;

a threshold value setting unit for calculating a threshold value for determining whether or not to let the wireless resource be the candidate allocated to the other communication device, based on the measured congestion degree; and a determination unit for comparing the index value with the threshold value to determine whether or not to let the wireless resource be the candidate allocated to the other communication device.

(Supplementary Note 36)

The computer program according to Supplementary Note 35, wherein the index value calculation unit calculates the index value according to each combination of the other communication device and the wireless resource.

(Supplementary Note 37)

The computer program according to Supplementary Note 35 or 36, wherein the communication device further includes a function as a base station of a wireless communication system, the other communication device is a terminal of the wireless communication system, and the wireless resource is utilized for transmission from the communication device itself to the other communication device.

(Supplementary Note 38)

The computer program according to Supplementary Note 35 or 36, wherein the communication device further includes a function as a base station of a wireless communication system, the other communication device is a terminal of the wireless communication system, and the wireless resource is utilized for transmission from the other communication device to the communication device itself.

(Supplementary Note 39)

The computer program according to any of Supplementary Notes 35 to 38, wherein the congestion degree measuring unit measures a value corresponding to the number of the other communication devices having communication data as the congestion degree.

(Supplementary Note 40)

The computer program according to any of Supplementary Notes 35 to 38, wherein the congestion degree measuring unit measures a margin of delay calculated from the delay time and allowable delay time of the data waiting for transmission as the congestion degree.

(Supplementary Note 41)

The computer program according to any of Supplementary Notes 35 to 38, wherein the congestion degree measuring unit measures a value corresponding to the size of the data waiting for transmission as the congestion degree.

(Supplementary Note 42)

The computer program according to any of Supplementary Notes 35 to 38, wherein the congestion degree measuring unit measures a dissatisfaction rate as the congestion degree, calculated as a probability of failing to finish sending the communication data within a predetermined delay time.

(Supplementary Note 43)

The computer program according to any of Supplementary Notes 35 to 38, wherein the congestion degree measuring unit measures a rate margin calculated from a required rate and an average transmission rate as the congestion degree.

REFERENCE SIGNS LIST

100 Transmitter
101 Transmitting and receiving portion
102 Transmission buffer
103 Scheduler
104 User number measuring portion
105 Threshold value update potion
106 Reference signal generation portion
107 Delay margin measuring portion
108 Data size measuring portion
200 Receiver
201 Receiver operation portion
202 Channel quality measuring portion
300 Transmitter
301 Data generation portion
302 Reference signal generation portion
303 Transmitting and receiving portion
400 Receiver
401 Transmitting and receiving portion
402 Scheduler
403 Channel quality measuring portion
404 User information management portion
405 Threshold value update portion

The invention claimed is:

1. An allocable wireless resource selection method for a wireless communication system including a first communication device or devices, and a second communication device in wireless communication with the first communication device, the selection method comprising:

calculating an index value according to each of the first communication devices for determining whether or not to let a wireless resource utilized for communications between the first communication device and the second communication device be a candidate allocated to the first communication device, based on the quality of a channel between the first communication device and the second communication device;

measuring a value indicating a congestion degree between the first communication device and the second communication device;

calculating a threshold value, such that the threshold value increases as the measured value decreases, for determining whether or not to let the wireless resource be the candidate allocated to the first communication device, based on the measured value indicating the congestion degree; and comparing the index value with the threshold value to determine whether or not to let the wireless resource be the candidate allocated to the first communication device.

2. The allocable wireless resource selection method according to claim 1, wherein the index value is calculated according to each combination of the first communication device and the wireless resource.

3. The allocable wireless resource selection method according to claim 1, wherein the second communication device is a base station of the wireless communication system, the first communication device is a terminal of the wireless communication system, and the wireless resource is utilized for transmission from the second communication device to the first communication device.

4. The allocable wireless resource selection method according to claim 1, wherein the second communication device is a base station of the wireless communication system, the first communication device is a terminal of the wireless communication system, and the wireless resource is utilized for transmission from the first communication device to the second communication device.

5. The allocable wireless resource selection method according to claim 1, wherein, in measuring the value indicating the congestion degree, a value corresponding to the number of the first communication devices having communication data is measured as the congestion degree.

6. The allocable wireless resource selection method according to claim 1, wherein, in measuring the value indicating the congestion degree, a margin of delay calculated from the delay time and allowable delay time of the data waiting for transmission is measured as the value indicating the congestion degree.

7. The allocable wireless resource selection method according to claim 1, wherein in measuring the value indicating the congestion degree, a value corresponding to the size of the data waiting for transmission is measured as the value indicating the congestion degree.

8. The allocable wireless resource selection method according to claim 1, wherein in measuring the value indicating the congestion degree, a dissatisfaction rate is measured as the value indicating the congestion degree, indicating a probability of failing to finish sending the communication data within a predetermined delay time.

9. The allocable wireless resource selection method according to claim 1, wherein in measuring the value indicating the congestion degree, a rate margin calculated from a required rate and an average transmission rate is measured as the value indicating the congestion degree.

10. The allocable wireless resource selection method according to claim 1, wherein in calculating the threshold value, the value of a parameter p is decided according to the value indicating the congestion degree, and p% of a cumulative density function of the index value is calculated as the threshold value.

11. The allocable wireless resource selection method according to claim 1, wherein in calculating the threshold value, a monotonically decreasing function according to the value indicating the congestion degree is utilized to calculate the threshold value.

12. The allocable wireless resource selection method according to claim 1, wherein in calculating the threshold value, the threshold value is calculated by calculating an offset value according to the value indicating the congestion degree and adding the offset value to a reference value.

13. The allocable wireless resource selection method according to claim 1, wherein in calculating the threshold value, the threshold value is calculated by selecting a step value according to the value indicating the congestion degree and adding the step value to the latest threshold value.

14. The allocable wireless resource selection method according to claim 1, wherein in calculating the threshold value, the threshold value is calculated as a common value regardless of the combination of the first communication device and the second communication device.

15. The allocable wireless resource selection method according to claim 1, wherein in calculating the threshold value, the threshold value is calculated according to each combination of the first communication device and the second communication device.

16. The allocable wireless resource selection method according to claim 1, wherein in calculating the threshold value, the threshold value is calculated according to each data flow.

17. An allocable wireless resource selection device for a wireless communication system including a first communication device or devices, and a second communication device in wireless communication with the first communication device, the selection device comprising:
a scheduler unit configured to calculate an index value according to each of the first communication devices for determining whether or not to let a wireless resource utilized for communications between the first communication device and the second communication device be a candidate allocated to the first communication device, based on the quality of a channel between the first communication device and the second communication device;
a congestion degree measuring unit configured to measure a value indicating a congestion degree between the first communication device and the second communication device;
a threshold value setting unit configured to calculate a threshold value, such that the threshold value increases as the measured value decreases, for determining whether or not to let the wireless resource be the candidate allocated to the first communication device, based on the measured value indicating the congestion degree; and
the scheduler unit configured to compare the index value with the threshold value to determine whether or not to let the wireless resource be the candidate allocated to the first communication device.

18. The allocable wireless resource selection device according to claim 17, wherein the scheduler unit calculates the index value according to each combination of the first communication device and the wireless resource.

19. A communication device in wireless communication with another communication device or devices, the communication device comprising:
a scheduler unit configured to calculate an index value according to each of the other communication devices for determining whether or not to let a wireless resource utilized for communications between itself and the other communication device be a candidate allocated to the other communication device, based on the quality of a channel between itself and the other communication device;
a congestion degree measuring unit configured to measure a value indicating a congestion degree between itself and the other communication device;
a threshold value setting unit configured to calculate a threshold value, such that the threshold value increases as the measured value decreases, for determining whether or not to let the wireless resource be the candidate allocated to the other communication device, based on the measured value indicating the congestion degree; and
the scheduler unit configured to compare the index value with the threshold value to determine whether or not to let the wireless resource be the candidate allocated to the other communication device.

20. The communication device according to claim 19, wherein the scheduler unit calculates the index value according to each combination of the other communication device and the wireless resource.

* * * * *